(12) United States Patent
Namiki et al.

(10) Patent No.: US 11,043,693 B2
(45) Date of Patent: Jun. 22, 2021

(54) LITHIUM ION SECONDARY BATTERY, BATTERY PACK, AND VEHICLE

(71) Applicant: KABUSHIKI KAISHA TOSHIBA, Minato-ku (JP)

(72) Inventors: Yusuke Namiki, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 243 days.

(21) Appl. No.: 15/907,808

(22) Filed: Feb. 28, 2018

(65) Prior Publication Data

US 2019/0088983 A1    Mar. 21, 2019

(30) Foreign Application Priority Data

Sep. 20, 2017  (JP) .............................. JP2017-179953

(51) Int. Cl.
*H01M 10/0525*    (2010.01)
*H01M 4/485*    (2010.01)
(Continued)

(52) U.S. Cl.
CPC ...... *H01M 10/0525* (2013.01); *C01G 23/003* (2013.01); *H01M 4/131* (2013.01);
(Continued)

(58) Field of Classification Search
CPC ......... H01M 10/0525; H01M 10/0568; H01M 10/0569; H01M 4/131; H01M 4/485
See application file for complete search history.

(56) References Cited

U.S. PATENT DOCUMENTS

2002/0192546 A1* 12/2002 Mao .................. H01M 6/164
429/188
2013/0280622 A1  10/2013 Tokuda et al.
(Continued)

FOREIGN PATENT DOCUMENTS

CN    107039632 A    8/1917
CN    105633466 A  *  6/2016
(Continued)

OTHER PUBLICATIONS

Sun, Y. et al., "Direct atomic-scale confirmation of three-phase storage mechanism in $Li_4Ti_5O_{12}$ anodes for room-temperature sodium-ion batteries" Nature Communications, May 21, 2013, pp. 1-10.

*Primary Examiner* — Jonathan G Jelsma
(74) *Attorney, Agent, or Firm* — Oblon, McClelland, Maier & Neustadt, L.L.P.

(57) ABSTRACT

According to one embodiment, a lithium ion secondary battery is provided. The lithium ion secondary battery includes a negative electrode containing a negative electrode active material-containing layer, a positive electrode, and an electrolyte containing Li ions and Na ions. The negative electrode active material-containing layer contains a Na-containing titanium composite oxide. A ratio ($W_E/W_A$) of an Na amount $W_E$ (g/g) in the electrolyte to an Na amount $W_A$ (g/g) in the negative electrode active material-containing layer satisfies Formula (1) below:

$$1\times10^{-1} \leq W_E/W_A \leq 1\times10^5 \qquad (1).$$

13 Claims, 6 Drawing Sheets

(51) Int. Cl.
*H01M 4/131* (2010.01)
*H01M 10/0568* (2010.01)
*H01M 10/0569* (2010.01)
*C01G 23/00* (2006.01)
*H01M 10/42* (2006.01)
*H01M 4/36* (2006.01)
*H01M 10/44* (2006.01)
*H01M 10/052* (2010.01)
*H01M 4/02* (2006.01)

(52) U.S. Cl.
CPC ......... *H01M 4/366* (2013.01); *H01M 4/485* (2013.01); *H01M 10/052* (2013.01); *H01M 10/0568* (2013.01); *H01M 10/0569* (2013.01); *H01M 10/425* (2013.01); *H01M 10/44* (2013.01); *H01M 2004/027* (2013.01); *H01M 2004/028* (2013.01); *H01M 2220/20* (2013.01); *H01M 2300/0037* (2013.01)

(56) References Cited

U.S. PATENT DOCUMENTS

| | | |
|---|---|---|
| 2015/0050557 A1 | 2/2015 | Nakayama et al. |
| 2015/0118549 A1 | 4/2015 | Yoshida |
| 2016/0036039 A1 | 2/2016 | Kuriyama et al. |
| 2016/0226067 A1 | 8/2016 | Harada et al. |
| 2016/0268603 A1 | 9/2016 | Harada et al. |
| 2017/0062817 A1 | 3/2017 | Inagaki et al. |
| 2017/0077499 A1 | 3/2017 | Hoshina et al. |
| 2017/0077508 A1 | 3/2017 | Hoshina et al. |
| 2017/0077547 A1 | 3/2017 | Takami et al. |
| 2017/0271664 A1 | 9/2017 | Harada et al. |

FOREIGN PATENT DOCUMENTS

| | | |
|---|---|---|
| JP | 5850007 | 2/2016 |
| JP | 2016-029668 | 3/2016 |
| JP | 2016-035902 | 3/2016 |
| JP | 2016-103325 | 6/2016 |
| JP | 2016-146359 | 8/2016 |
| JP | 2016-171071 | 9/2016 |
| JP | 2017-045569 | 3/2017 |
| JP | 2017-059390 | 3/2017 |
| JP | 2017-059392 | 3/2017 |
| JP | 2017-168320 | 9/2017 |
| WO | WO 2013/022034 A1 | 2/2013 |
| WO | WO 2017/135323 A1 | 8/2017 |
| WO | WO 2018/020669 A1 | 2/2018 |

* cited by examiner

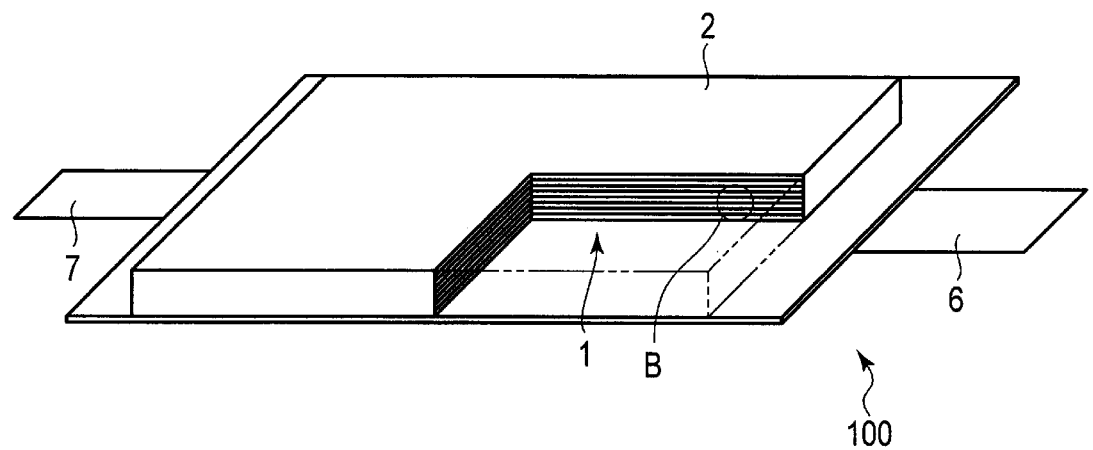
F I G. 3
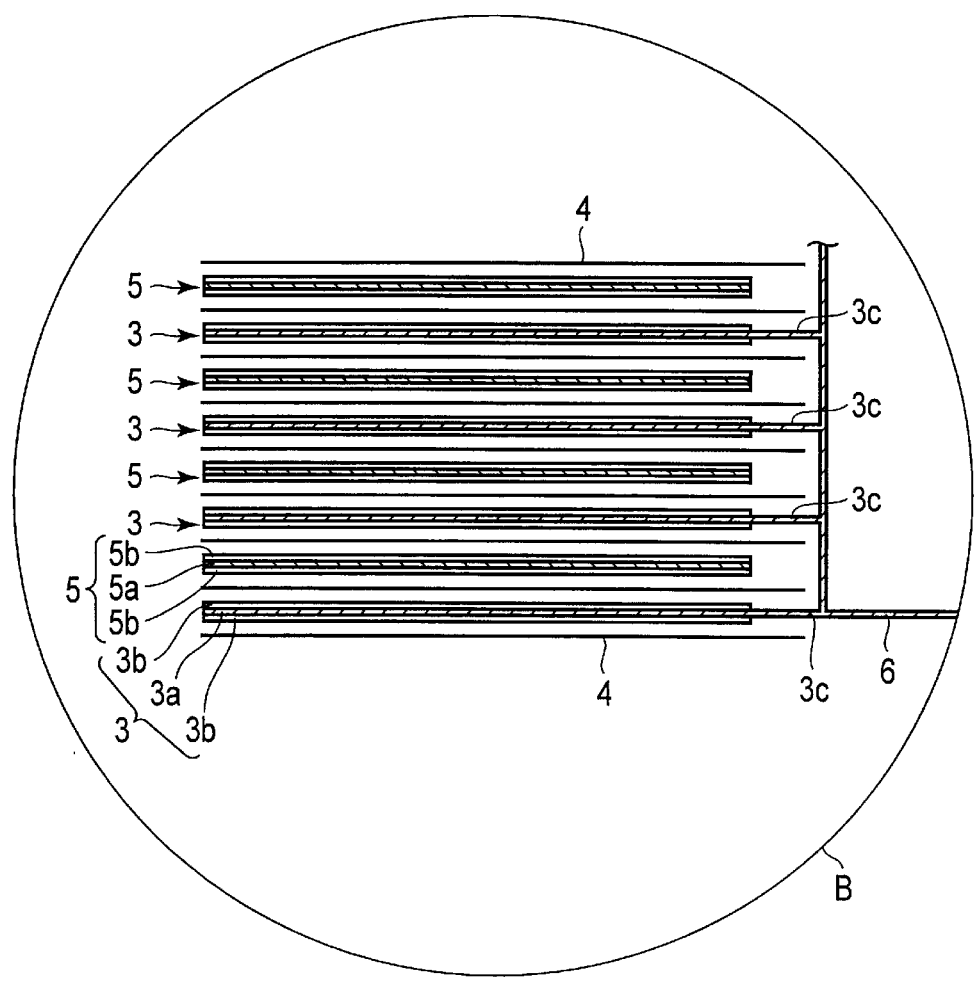
F I G. 4

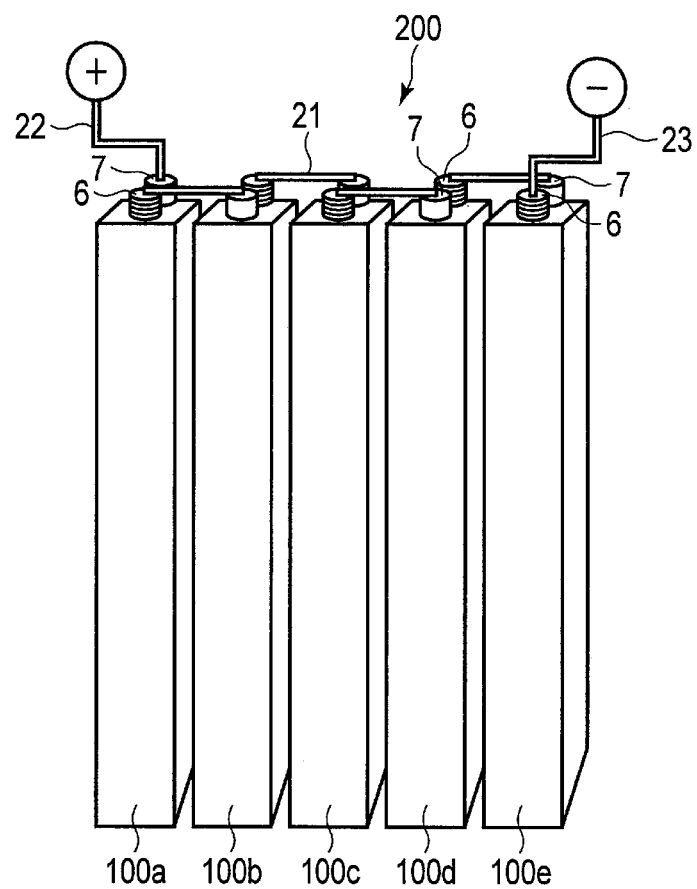
F I G. 5

LITHIUM ION SECONDARY BATTERY, BATTERY PACK, AND VEHICLE

CROSS-REFERENCE TO RELATED APPLICATIONS

This application is based upon and claims the benefit of priority from Japanese Patent Application No. 2017-179953, filed Sep. 20, 2017, the entire contents of which are incorporated herein by reference.

FIELD

Embodiments described herein relate generally to a lithium ion secondary battery, a battery pack, and a vehicle.

BACKGROUND

A nonaqueous electrolyte battery in which a charge and discharge is performed by migration of lithium ions between a negative electrode and a positive electrode is actively researched as a high energy-density battery.

In addition to the use as a power supply for small electronic devices, the nonaqueous electrolyte battery is expected to be used as a medium to large power supply such as the on-board use and stationary use. For such a medium to large-scale use, life performance and high-level safety are required. Further, high input and output characteristics are needed.

As an example of the nonaqueous electrolyte battery having life performance and high-level safety, a nonaqueous electrolyte battery using spinel lithium titanate for the negative electrode is known. However, since spinel lithium titanate has a high lithium insertion/extraction potential of about 1.55 V (vs. Li/Li$^+$), a nonaqueous electrolyte battery using spinel lithium titanate for the negative electrode has a low battery voltage. In addition, spinel lithium titanate is characterized by a very small change of the potential accompanying change of a charged state within a range of the lithium insertion and extraction potential. That is, a charge-and-discharge curve of spinel lithium titanate includes a flat part of the potential within the range of the lithium insertion and extraction potential.

In such a nonaqueous electrolyte battery, further improvement of life performance is required.

BRIEF DESCRIPTION OF THE DRAWINGS

FIG. 3 is a partially notched perspective view schematically showing another example of the lithium ion secondary battery according to the first embodiment;

FIG. 4 is an enlarged cross-sectional view showing part B of the lithium ion secondary battery shown in FIG. 3;

FIG. 5 is a perspective view schematically showing an example of a battery module according to the first embodiment;

DETAILED DESCRIPTION

Figure 1:
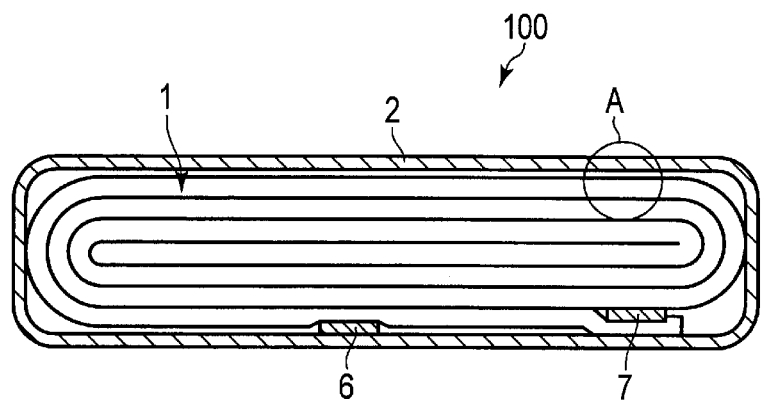
FIG. 1 is a cross-sectional view schematically showing an example of a lithium ion secondary battery according to the first embodiment.

According to a first embodiment, a lithium ion secondary battery is provided. The lithium ion secondary battery includes a negative electrode containing a negative electrode active material-containing layer, a positive electrode, and an electrolyte containing Li ions and Na ions. The negative electrode active material-containing layer contains a Na-containing titanium composite oxide. A ratio ($W_E/W_A$) of an Na amount $W_E$ (g/g) in the electrolyte to an Na amount $W_A$ (g/g) in the negative electrode active material-containing layer satisfies Formula (1) below:

$$1 \times 10^{-1} \leq W_E/W_A \leq 1 \times 10^5 \quad (1).$$

According to a second embodiment, a battery pack is provided. The battery pack includes the lithium ion secondary battery according to the first embodiment.

According to a third embodiment, a vehicle is provided. The vehicle includes the battery pack according to the second embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a lithium ion secondary battery is provided. The lithium ion secondary battery includes a negative electrode containing a negative electrode active material-containing layer, a positive electrode, and an electrolyte containing Li ions and Na ions. The negative electrode active material-containing layer contains a Na-containing titanium composite oxide. A ratio ($W_E/W_A$) of an Na amount $W_E$ (g/g) in the electrolyte to an Na amount $W_A$ (g/g) in the negative electrode active material-containing layer satisfies Formula (1) below:

$$1 \times 10^{-1} \leq W_E/W_A \leq 1 \times 10^5 \quad (1).$$

The Na-containing titanium composite oxide is, among titanium oxides, a composite oxide capable of having lithium ions be inserted and extracted at a relatively low potential.

Among Na-containing titanium composite oxides, for example, orthorhombic Na-containing niobium titanium composite oxide represented by a general formula $Li_{2+v}Na_{2-w}M1_xTi_{6-y-z}Nb_yM2_zO_{14+\delta}$ can exhibit a lithium insertion and extraction potential as an operating potential within a range of about 1.2 to 1.4 V (vs. Li$^+$/Li). In the above general formula, M1 is at least one element selected from a group consisting of Cs, K, Mg, Sr, Ba, and Ca, M2 is at least one selected from a group consisting of Zr, Sn, V, Ta, Mo, W, Fe, Co, Mn, and Al, v is within a range of $0 \leq v \leq 4$, w is within a range of $0 \leq w < 2$, x is within a range of $0 \leq x < 2$, y is within a range of $0 < y < 2$, z is within a range of $0 \leq z < 3$, and δ is within a range of $-0.5 \leq \delta \leq 0.5$.

Also, orthorhombic Na-containing niobium titanium composite oxide represented by the general formula $Li_{2+v}Na_{2-w}M1_xTi_{6-y-z}Nb_yM2_zO_{14+\delta}$ can exhibit a large potential change accompanying change of a charged state at an operating potential within a range of about 1.2 to 1.4 V.

Therefore, compared with a nonaqueous electrolyte battery using lithium titanate for the negative electrode, a nonaqueous electrolyte battery using Na-containing titanium composite oxide for the negative electrode can exhibit a high battery voltage and also grasp a charge state easily based on potential changes.

However, as a result of intensive research, the inventors found that a secondary battery in which the negative electrode contains Na-containing titanium composite oxide has a problem of inferior life performance. The cause of the problem is not yet clarified, but the inventors think about the cause as described below.

When a secondary battery in which the negative electrode contains Na-containing titanium composite oxide is charged and discharged, the Na element constituting the crystal lattice of the Na-containing titanium composite oxide is eluted into the electrolyte due to distortion and volume expansion of the crystal structure accompanying charging and discharging. As a result, the number of sites capable of having lithium ions be inserted per unit volume decreases, leading to deterioration of cycle life performance.

Therefore, a lithium ion secondary battery according to the embodiment contains Na ions in the electrolyte, and the ratio $(W_E/W_A)$ of an Na amount $W_E$ (g/g) in the electrolyte to an Na amount $W_A$ (g/g) in the negative electrode active material-containing layer is set to within a range of $1\times10^{-1} \leq W_E/W_A \leq 1\times10^5$. Accordingly, the Na element is less likely to be eluted from the crystal structure of the Na-containing titanium composite oxide contained in the negative electrode, thereby improving cycle life performance.

The ratio $(W_E/W_A)$ is preferably within a range of $1\times10^0 \leq W_E/W_A \leq 1\times10^4$ and more preferably within a range of $1\times10^0 \leq W_E/W_A \leq 1\times10^3$. The ratio $(W_E/W_A)$ may also be within a range of $1\times10^1 \leq W_E/W_A \leq 1\times10^4$.

Hereinafter, the lithium ion secondary battery according to the embodiment will be described in detail.

A lithium ion secondary battery according to the embodiment includes a negative electrode, a positive electrode, and an electrolyte. The lithium ion secondary battery may further include a separator arranged between the positive electrode and the negative electrode. The negative electrode, the positive electrode, and the separator can constitute an electrode group. The electrolyte may be held by the electrode group.

The lithium ion secondary battery may further include a container member configured to house the electrode group and the electrolyte.

The lithium ion secondary battery may further include a negative electrode terminal electrically connected to the negative electrode and a positive electrode terminal electrically connected to the positive electrode.

The lithium ion secondary battery is, for example, a nonaqueous electrolyte secondary battery containing a nonaqueous electrolyte.

Hereinafter, the electrolyte, negative electrode, positive electrode, separator, container member, negative electrode terminal, and positive electrode terminal will be described in detail.

(1) Electrolyte

As an electrolyte, for example, a liquid nonaqueous electrolyte can be used. The liquid nonaqueous electrolyte is prepared by dissolving lithium salt as a solute in an organic solvent. The concentration of the lithium salt is preferably within a range of 0.5 mol/L to 2.5 mol/L.

Examples of the lithium salt include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$) and mixtures of the above lithium salts. The lithium salt is preferably one that is difficult to oxidize even at a high potential and $LiPF_6$ is particularly preferable.

The electrolyte contains Na ions. Na ions are ions derived from, for example, Na salt. The amount $W_E$ of Na ions contained in the electrolyte can be adjusted by, for example, changing the concentration of Na salt added to the electrolyte.

The amount $W_E$ of Na ions contained in the electrolyte is within a range of, for example, $1\times10^{-5}$ g/g to $1\times10^{-2}$ g/g and preferably within a range of $1\times10^{-5}$ g/g to $1\times10^{-1}$ g/g. If the amount $W_E$ of Na ions contained in the electrolyte is excessively small, it is difficult to sufficiently suppress elution of Na ions from Na-containing titanium composite oxide as the negative electrode active material. On the other hand if the amount $W_E$ of Na ions contained in the electrolyte is excessively large, the viscosity of the electrolyte tends to become too high. Thus, ionic conductivity may decrease, and cycle performance and output performance tend to decrease.

The amount $W_E$ of Na ions contained in the electrolyte can be analyzed by the inductively coupled plasma (ICP) emission spectrochemical analysis described below. Note that the amount $W_E$ of Na ions represents the mass amount of Na ions in 1 g of the electrolyte.

The concentration of Na ions contained in the electrolyte is preferably within a range of 0.6 mol/L to 2.0 mol/L.

To prevent the viscosity of the electrolyte from increasing, the total concentration of the Li ion concentration (mol/L) and the Na ion concentration (mol/L) contained in the electrolyte is preferably 4.0 mol/L or less.

As the Na salt, for example, at least one selected from a group consisting of $NaPF_6$, $NaBF_4$, $NaClO_4$, $NaAsF_6$, $NaCF_3SO_3$, and $NaN(CF_3SO_2)_2$ can be cited. The electrolyte may contain one of these Na salts or two or more Na salts.

Among the above Na salts, $NaPF_6$ is preferable because it is difficult to oxidize even at a high potential.

Examples of the organic solvent include cyclic carbonate such as propylene carbonate (PC), ethylene carbonate (EC), and vinylene carbonate (VC), chain carbonate such as diethyl carbonate (DEC), dimethyl carbonate (DMC), and ethyl methyl carbonate (MEC), cyclic ether such as tetrahydrofuran (THF), 2-methyl tetrahydrofuran (2MeTHF), and dioxolane (DOX), chain ether such as dimethoxy ethane (DME) and diethoxy ethane (DEE), γ-butyrolactone (GBL), acetonitrile (AN), and sulfolane (SL). These organic solvents can be used alone or as a mixed solvent.

The organic solvent contained in the electrolyte is preferably a high-temperature durable solvent. If high-temperature durability of the organic solvent is low, the solvent is decomposed and a gas is generated in a high-temperature environment so that metal ions such as Na ions are more likely to be eluted and life performance tends to deteriorate.

As a high-temperature durable solvent, for example, at least one solvent selected from a group consisting of propylene carbonate (PC), ethylene carbonate (EC), diethyl carbonate (DEC), dimethyl carbonate (DMC), and ethyl methyl carbonate (EMC). The electrolyte may contain one kind of organic solvent or two or more kinds may be mixed and contained.

Particularly, the electrolyte preferably contains a solvent made of propylene carbonate (PC) and ethyl methyl carbonate (EMC) and the ratio of PC and EMC is preferably 1:2 by volume. The electrolyte preferably contains $LiPF_6$ as a Li salt in a concentration of 1.2 M (mol/L). The electrolyte preferably contains $NaPF_6$ as a Na salt in a concentration of 1.2 M (mol/L). Most preferably, the electrolyte contains a solvent (volume ratio 1:2) made of PC and EMC, $LiPF_6$ of 1.2 M and $NaPF_6$ of 1.2 M. Since the concentrations of the Li salt and the Na salt of the electrolyte are each not so high and thus, elution of the Na element from the negative electrode can be suppressed while being suppressed the rise of viscosity of the electrolyte.

Alternatively, a room temperature molten salt containing Li ions (ionic melt) may also be used as the nonaqueous electrolyte.

The room temperature molten salt (ionic melt) refers to, among organic salts formed by combining organic cations and anions, compounds that can exist as a liquid at room temperature (within a range of 15 to 25° C.). The room temperature molten salt includes room temperature molten salt that exists as a liquid alone, room temperature molten salt that is changed to a liquid by being mixed with an electrolyte salt, and room temperature molten salt that is changed to a liquid by being dissolved in an organic solvent or a mixture of these salts. In general, the melting point of room temperature molten salt used for a secondary battery is 25° C. or less. The organic cation generally has a quaternary ammonium skeleton.

<Method of Measuring Na Amount in Electrolyte>

(Preparation of the Measurement Sample)

First, a measurement sample is prepared by the following procedure.

A lithium ion secondary battery to be analyzed is prepared. The battery to be analyzed has a capacity of 80% or more of a nominal capacity.

The lithium ion secondary battery is set to a discharge state. For example, the lithium ion secondary battery can be set to the discharge state by performing a discharge until a battery voltage reaches 1.8 V by a constant current of 5C or less.

Subsequently, the lithium ion secondary battery is moved into a glove box filled with argon and disassembled there. The electrolytic solution is extracted from the disassembled battery.

(ICP Analysis Procedure)

By subjecting an electrolytic solution sample prepared as described above to ICP emission spectrochemical analysis, metallic elements including the Na element contained in the electrolytic solution can be determined.

(2) Negative Electrode

The negative electrode may include a negative electrode current collector and a negative electrode active material-containing layer. The negative electrode active material-containing layer may be formed on one side or both sides of the negative electrode current collector. The negative electrode active material-containing layer may include a negative electrode active material and also optionally a conductive agent and a binder.

The negative electrode active material-containing layer contains a Na-containing titanium composite oxide. The Na-containing titanium composite oxide is, for example, a Na-containing titanium composite oxide having an orthorhombic crystal structure. The Na-containing titanium composite oxide may be Na-containing niobium titanium composite oxide. The Na-containing titanium composite oxide is preferably Na-containing niobium titanium composite oxide having an orthorhombic crystal structure.

The amount of Na element contained in the negative electrode active material-containing layer changes depending on, for example, the amount of Na element contained in the Na-containing titanium composite oxide. The amount of Na element contained in the Na-containing titanium composite oxide can appropriately be changed in accordance with the intended composition when the negative electrode active material is produced. The method of producing the Na-containing titanium composite oxide as the negative electrode active material will be described below.

The amount $W_A$ of Na element contained in the negative electrode active material-containing layer is within a range of, for example, $1 \times 10^{-6}$ g/g to $1 \times 10^{-4}$ g/g and preferably within a range of $2 \times 10^{-5}$ g/g to $8 \times 10^{-5}$ g/g. When the amount $W_A$ of Na element contained in the negative electrode active material-containing layer is within the above range, the cycle performance can further be improved. Note that the amount $W_A$ of Na ions represents the mass amount of Na ions in 1 g of the negative electrode active material-containing layer.

The Na-containing niobium titanium composite oxide having an orthorhombic crystal structure contains composite oxide represented by, for example, the general formula $Li_{2+v}Na_{2-w}M1_xTi_{6-y-z}Nb_yM2_zO_{14+\delta}$. In the above general formula, M1 is at least one element selected from a group consisting of Cs, K, Mg, Sr, Ba, and Ca, M2 is at least one selected from a group consisting of Zr, Sn, V, Ta, Mo, W, Fe, Co, Mn, and Al, v is within a range of $0 \leq v \leq 4$, w is within a range of $0 \leq w < 2$, x is within a range of $0 \leq x < 2$, y is within a range of $0 < y < 2$, z is within a range of $0 \leq z < 3$, and $\delta$ is within a range of $-0.5 \leq \delta \leq 0.5$.

In the above general formula, the subscript v changes within a range of $0 \leq v \leq 4$ in accordance with a charged state of the orthorhombic Na-containing niobium titanium composite oxide.

In the above general formula, M1 is at least one element selected from a group consisting of Cs, K, Mg, Sr, Ba, and Ca. The orthorhombic Na-containing niobium titanium composite oxide can achieve more excellent cycle performance by containing Cs. The orthorhombic Na-containing niobium titanium composite oxide can achieve more excellent cycle performance by containing K. The orthorhombic Na-containing niobium titanium composite oxide can achieve more excellent rate performance by containing Mg. The orthorhombic Na-containing niobium titanium composite oxide can achieve more excellent rate performance by containing Sr. The orthorhombic Na-containing niobium titanium composite oxide can achieve more excellent rate performance by containing Ba. The orthorhombic Na-containing niobium titanium composite oxide can achieve more excellent rate performance by containing Ca. M1 preferably contains at least one of Sr and Ba.

In the above general formula, the subscript x is the value in the range of $0 \leq x < 2$. If the orthorhombic Na-containing niobium titanium composite oxide includes M1 such that the subscript x is 2 or more, it is difficult to obtain a single crystal phase and further, Li diffusibility in the solid decreases, thereby degrading input and output characteristics. It is preferable that the subscript x is the value in the range of 0.05 to 0.2. The orthorhombic Na-containing niobium titanium composite oxide in which the subscript x is in the above range can exhibit more excellent rate performance.

In the above general formula, the subscript w is the value in the range of $0 \leq w < 2$. When the subscript w is in the above range, cycle performance of the orthorhombic Na-containing niobium titanium composite oxide is improved. The preferable range of the subscript w is $0 \leq w \leq 1.5$.

In the above general formula, the subscript y is the value in the range of $0<y<2$. When the value of the subscript y is larger than 0, a higher reversible capacitance can be realized. If the value of the subscript y is 2 or larger, on the other hand, it is difficult to obtain a single crystal phase and further, Li diffusibility in the solid decreases, thereby degrading input and output characteristics. Preferably, the subscript y is in the range of $0.1 \leq y \leq 0.8$. If the value of the subscript y is smaller than 0.1, the effect of decreasing resistance at high SOC cannot be obtained. If the value of the subscript y is larger than 0.8, on the other hand, reversible charge-and-discharge capacity decreases and further, input and output characteristics deteriorate. It is preferable that the subscript y is the value in the range of 0.1 to 1. The orthorhombic Na-containing niobium titanium composite oxide in which the value of the subscript y is in the above range can exhibit more excellent rate performance.

M2 is at least one of elements selected from a group consisting of Zr, Sn, V, Ta, Mo, W, Fe, Co, Mn, and Al. The orthorhombic Na-containing niobium titanium composite oxide can achieve more excellent cycle performance by containing Zr. The orthorhombic Na-containing niobium titanium composite oxide can achieve more excellent rate performance by containing Sn. V and Ta can exhibit physical and chemical properties similar to those of Nb. The orthorhombic Na-containing niobium titanium composite oxide can achieve more excellent rate performance by containing Mo. The orthorhombic Na-containing niobium titanium composite oxide can achieve more excellent rate performance by containing W. The orthorhombic Na-containing niobium titanium composite oxide can achieve more excellent cycle performance by containing Fe. The orthorhombic Na-containing niobium titanium composite oxide can achieve more excellent cycle performance by containing Co. The orthorhombic Na-containing niobium titanium composite oxide can achieve more excellent cycle performance by containing Mn. The orthorhombic Na-containing niobium titanium composite oxide can achieve more excellent rate performance by containing Al. M2 preferably contains at least one element selected from a group consisting of Al, Zr, Sn, and V. In another preferred embodiment, M2 is at least one element selected from a group consisting of Sn, V, Ta, Mo, W, Fe, Co, and Mn.

In the above general formula, the subscript z is the value in the range of $0 \leq z < 3$. If the orthorhombic Na-containing niobium titanium composite oxide includes M2 such that the subscript z is 3 or more, it is difficult to obtain a single crystal phase and further, Li diffusibility in the solid decreases, thereby degrading input and output characteristics. It is preferable that the subscript z is the value in the range of 0.1 to 0.3. The orthorhombic Na-containing niobium titanium composite oxide in which the value of the subscript z is in the above range can exhibit more excellent rate performance.

The subscript δ is the value in the range of $-0.5 \leq \delta \leq 0.5$. If the value of the subscript δ is smaller than $-0.5$, the charge-and-discharge cycle performance deteriorates. If the value of the subscript δ is larger than 0.5, on the other hand, it is difficult to obtain a single crystal phase and impurities are more likely to be generated. It is preferable that the subscript δ is the value in the range of $-0.1 \leq \delta \leq 0.1$. The orthorhombic Na-containing niobium titanium composite oxide in which the value of the subscript δ is in the above range can exhibit more excellent rate performance and more excellent cycle performance.

Particles of orthorhombic Na-containing niobium titanium composite oxide may be primary particles or secondary particles as an aggregate of primary particles. Alternatively, particles of orthorhombic Na-containing niobium titanium composite oxide may be a mixture of primary particles and secondary particles. Further, particles of orthorhombic Na-containing niobium titanium composite oxide may have carbon attached to the surface thereof. Carbon may be attached to the surface of primary particles or to the surface of secondary particles. Alternatively, particles of orthorhombic Na-containing niobium titanium composite oxide may contain secondary particles formed by primary particles having carbon attached to the surface thereof being aggregated. Such secondary particles can exhibit excellent conductivity because carbon is present between primary particles. A configuration in which such secondary particles are contained is preferable because the electrode active material-containing layer can exhibit still lower resistance.

The average primary particle size of particles of orthorhombic Na-containing niobium titanium composite oxide is preferably in the range of 0.5 μm to 3 μm and more preferably in the range of 0.9 μm to 2 μm. The average secondary particle size of particles of orthorhombic Na-containing niobium titanium composite oxide is preferably in the range of 5 μm to 20 μm and more preferably in the range of 8 μm to 12 μm. These preferred particle sizes are particle sizes of particles without containing carbon. The average primary particle size of particles containing carbon is preferably in the range of 0.8 μm to 3 μm and more preferably in the range of 1 μm to 2 μm. The average secondary particle size is preferably in the range of 5 μm to 25 μm and more preferably in the range of 8 μm to 15 μm.

When particles of orthorhombic Na-containing niobium titanium composite oxide are a mixture of primary particles and secondary particles, the average particle size is preferably in the range of 3 μm to 10 μm and more preferably in the range of 4 μm to 7 μm.

Incidentally, the diameter of pores in the negative electrode active material-containing layer can be decreased with a decreasing average primary particle size of particles contained in the negative electrode active material-containing layer. This applies to also secondary particles. That is, the diameter of pores in the negative electrode active material-containing layer can be decreased with a decreasing average secondary particle size of particles contained in the negative electrode active material-containing layer. By adjusting the particle distribution of primary particles and/or secondary particles, the percentage of void of the negative electrode active material-containing layer can be adjusted. For example, by containing particles having the average particle size of about 1 μm and particles having the average particle size of about 10 μm in the negative electrode active material-containing layer, gaps formed by particles having the larger particle size can be filled with particles having the smaller particle size. Accordingly, the percentage of void of the negative electrode active material-containing layer can be decreased. From the above viewpoint, the orthorhombic Na-containing niobium titanium composite oxide contained in the negative electrode active material-containing layer is preferably a mixture of primary particles and secondary particles. According to the negative electrode in such a preferred configuration, since the negative electrode active material-containing layer contains small primary particles and large secondary particles, the negative electrode active material-containing layer can have a smaller percentage of void and further, higher accessibility of particles of the orthorhombic Na-containing niobium titanium composite oxide can be achieved.

The negative electrode active material preferably has a specific surface area of from 0.1 m$^2$/g to 50 m$^2$/g. When the specific surface area is within the above range, elution of Na and other metallic elements contained in the negative electrode active material can be suppressed. If the specific surface area is excessively small, life performance (cycle performance) and rate performance tend to deteriorate.

The orthorhombic Na-containing niobium titanium composite oxide as an example of Na-containing titanium composite oxide can be produced by, for example, as described below.

Orthorhombic Na-containing niobium titanium composite oxide can be synthesized by, for example, the solid phase method. Orthorhombic Na-containing niobium titanium composite oxide can also be synthesized by the sol-gel method or the wet synthesis method such as the hydrothermal synthesis. According to the wet synthesis, fine particles can be obtained more easily than the solid phase method.

Hereinafter, an example of the synthesis method of orthorhombic Na-containing niobium titanium composite oxide by the solid phase method will be described.

First, necessary materials among Ti sources, Li sources, Na sources, Nb sources, metallic element M1 sources, and metallic element M2 sources are prepared by adjusting to the intended composition. These materials may be, for example, oxide or compound salt. The above salt is preferably salt like carbonate and nitrate that is decomposed at a relatively low temperature to generate oxide.

Next, the prepared materials are mixed in an appropriate stoichiometric ratio to obtain a mixture. For example, when orthorhombic Na-containing niobium titanium composite oxide represented by the composition formula $Li_2Na_{1.7}Ti_{5.7}Nb_{0.3}O_{14}$ is synthesized, titanium oxide $TiO_2$, lithium carbonate $Li_2CO_3$, sodium carbonate $Na_2CO_3$, and niobium (V) hydroxide $Nb(OH)_5$ are mixed such that the molar ratio of Li:Na:Ti:Nb in the mixture is 2:1.7:5.7:0.3. $Nb(OH)_5$ represents pentavalent niobium hydroxide.

However, Li and Na may be lost due to heat treatment and so more of Li and Na may be mixed than the stoichiometric ratio of the intended composition. Particularly, the loss of Li during heat treatment is concerned and thus, Li may be mixed more than the stoichiometric ratio of the intended composition. If Li and Na are lost due to heat treatment, not only orthorhombic Na-containing niobium titanium composite oxide in single phase, but also impurities such as $TiO_2$ may also be synthesized. The loss of Li is considered to particularly affect battery properties.

In a method in which, for example, Li sources are made more than the stoichiometric ratio of the intended composition, lithium that does not contribute to synthesis may remain after heat treatment. Excessive lithium that did not contribute to synthesis may be present on the surface of particles as impurities without being incorporated into the crystal phase of the intended composition. If excessive lithium is present on the surface of particles as impurities, an electrolyte decomposition reaction is caused by the lithium on the surface of particles, which may lead to larger interface resistance between the electrode and the electrolyte. Therefore, as will be described below, orthorhombic Na-containing niobium titanium composite oxide obtained after heat treatment may be washed with an acidic solution or the like.

When mixing the materials, it is preferable to mix after these materials are sufficiently pulverized. By mixing sufficiently pulverized materials, materials are more likely to react and the generation of impurities can be suppressed.

Next, the mixture obtained by the above mixing is thermally treated in the atmosphere at 800° C. to 1000° C. for a time in the range of one hour to 24 hours. If the temperature is lower than 800° C., adequate crystallinity may not be obtained. If the temperature exceeds 1000° C., particle growth may proceed too much to form coarse particles, which is not preferable. If the heat treatment time is less than one hour, adequate crystallinity may not be obtained. If the heat treatment time is made longer than 24 hours, particle growth may proceed too much to form coarse particles, which is not preferable.

It is preferable to thermally treat the mixture in the range of 850° C. to 950° C. for a time in the range of two hours to five hours. In this manner, orthorhombic Na-containing niobium titanium composite oxide can be obtained. The obtained orthorhombic Na-containing niobium titanium composite oxide may be recovered and then annealed.

For example, orthorhombic Na-containing niobium titanium composite oxide represented by the composition formula $Li_2Na_{1.7}Ti_{5.7}Nb_{0.3}O_{14}$ can be obtained by thermally treating the mixture obtained by, as described above, mixing the materials in the atmosphere at 900° C. for three hours.

Next, it is preferable to wash the surface of active material particles by subjecting the orthorhombic Na-containing niobium titanium composite oxide obtained by heat treatment to, for example, grinding by a wet ball mill using an aqueous solution. Excessive lithium adhering to the surface of active material particles can be washed away by this washing. As the aqueous solution, for example, an acidic aqueous solution can be used. The acidic aqueous solution is a solution containing, for example, hydrochloric acid and sulfuric acid or the like. Instead of the aqueous solution, water may be used. It is preferable to use an acidic aqueous solution to do the washing adequately, because pH rises due to excessive lithium on the surface of particles.

The washing may also be done by dry mill grinding using no aqueous solution. The washing can be done without grinding by immersing the orthorhombic Na-containing niobium titanium composite oxide in an aqueous solution.

Subsequently, active material particles after washing are subjected to heat retreatment. The composition near the surfaces of active material particles may be crystallized by the heat retreatment. The temperature of the heat retreatment is in the range of, for example, 500° C. to 900° C. and preferably 600° C. to 700° C. If the temperature of the heat retreatment is less than 500° C., crystallinity of the surfaces of particles may be insufficient. If the temperature of the heat retreatment exceeds 900° C., there is the possibility of particle growth.

By removing excessive lithium present on the surface of active material particles after heat treatment as described above, a decomposition reaction of the nonaqueous electrolyte can be suppressed. Life performance is improved and also resistance can be decreased by suppressing the side reaction and thus, rate performance is also improved.

In the foregoing, a case in which the mixing ratio of materials is made more than the stoichiometric ratio of the intended composition was described, but the mixing ratio of materials may be the same as the stoichiometric ratio of the intended composition. Also in this case, lithium that is not incorporated into the crystal phase of the intended composition after heat treatment may be present and thus, life performance is improved by such lithium being removed.

The conductive agent can have function of improving current collecting performance and suppressing contact resistance between the active material and the current collector. Examples of the conductive agent include carbon materials such as acetylene black, carbon black, graphite, carbon nano-fiber, and carbon nano-tube. Among these, graphite and carbon nano-fiber are preferable. Compared with acetylene black and carbon black, graphite and carbon nano-fiber can more easily enter gaps between particles of Na-containing niobium titanium composite oxide so that voids of the negative electrode active material-containing layer can be made smaller. More preferably, carbon material particles having a large aspect ratio are used as the conductive agent. Carbon material particles here may be particles containing carbon materials or a fiber containing carbon materials. The preferable aspect ratio is 15 or more and more preferably 50 or more. Carbon material particles having a large aspect ratio can add conductivity in the thickness direction of the negative electrode active material-containing layer so that high input and output characteristics can be achieved. One of carbon materials described above may be used alone as the conductive agent or a plurality of carbon materials may be used.

The binder can have the action of binding the active material, conductive agent, and current collector. Examples of the binder include polytetrafluoro ethylene (PTFE), polyvinylidene difluoride (PVdF), fluororubber, styrene-butadiene rubber, acrylic resin or copolymers thereof, polyacrylic acid, and polyacrylonitrile.

The negative electrode active material-containing layer may contain, as the negative electrode active material, a Na-containing titanium composite oxide alone or two kinds of more of a Na-containing titanium composite oxide. The negative electrode active material-containing layer may also contain a mixture in which one kind or two kinds or more of a Na-containing titanium composite oxide and one kind or two kinds or more of other active materials are mixed.

The ratio of the weight of a Na-containing titanium composite oxide to the weight of the negative electrode active material is within a range of, for example, 70% to 100% and preferably 80% to 95%.

As other active materials, for example, lithium titanate having a ramsdellite structure (e.g. $Li_{2+y}Ti_3O_7$, $0 \leq y \leq 3$), lithium titanate having a spinel structure (e.g. $Li_{4+x}Ti_5O_{12}$, $0 \leq x \leq 3$), monoclinic titanium dioxide ($TiO_2$), anatase titanium dioxide, rutile titanium dioxide, hollandite titanium composite oxide, orthorhombic titanium composite oxide, and monoclinic niobium titanium composite oxide can be cited.

As an example of the orthorhombic titanium-containing composite oxide, a compound represented by $Li_{2+a}M(I)_{2-b}Ti_{6-c}M(II)_dO_{14+\sigma}$ can be cited. Where, M(I) is at least one element selected from a group consisting of Sr, Ba, Ca, Mg, Cs, Rb, and K. M(II) is at least one element selected from a group consisting of Zr, Sn, V, Nb, Ta, Mo, W, Y, Fe, Co, Cr, Mn, Ni, and Al. Each subscript in the composition formula is: $0 \leq a \leq 6$, $0 \leq b < 2$, $0 \leq c < 6$, $0 \leq d < 6$, and $-0.5 \leq \sigma \leq 0.5$.

As an example of the monoclinic niobium titanium composite oxide, a compound represented by $Li_xTi_{1-y}M1_yNb_{2-z}M2_zO_{7+\delta}$ can be cited. Where, M1 is at least one element selected from a group consisting of Zr, Si, and Sn. As used herein, M2 is at least one element selected from a group consisting of V, Ta, and Bi. Each subscript in the composition formula is: $0 \leq x \leq 5$, $0 \leq y < 1$, $0 \leq z < 2$, and $-0.3 \leq \delta \leq 0.3$. As a concrete example of the monoclinic niobium titanium composite oxide, $Li_xNb_2TiO_7$ ($0 \leq x \leq 5$) can be cited.

As another example of the monoclinic niobium titanium composite oxide, a compound represented by $Ti_{1-y}M3_{y+z}Nb_{2-z}O_{7-\delta}$ can be cited. Where, M3 is at least one element selected from Mg, Fe, Ni, Co, W, Ta, and Mo. Each subscript in the composition formula is: $0 \leq y < 1$, $0 \leq z < 2$, and $-0.3 \leq \delta \leq 0.3$.

The negative electrode active material preferably contains the negative electrode within a range of 70% by mass to 96% by mass, the conductive agent within a range of 2% by mass to 28% by mass, and the binder within a range of 2% by mass to 28% by mass. More preferably, the negative electrode active material is within a range of 85% by mass to 93% by mass. If the conductive agent is less than 2% by mass, current collecting performance of the negative electrode active material-containing layer decreases and so large-current characteristics of a lithium ion secondary battery may deteriorate. If the binder is less than 2% by mass, the binding property of the negative electrode active material-containing layer and the current collector decreases and so cycle performance may deteriorate. From the viewpoint of higher capacities, on the other hand, the conductive agent and the binder are each preferably set to 28% by mass or less.

A material that is electrochemically stable at a potential at which lithium (Li) is inserted into and extracted from the negative electrode active material is used as the negative electrode current collector. The negative electrode current collector is preferably made from, for example, copper, nickel, stainless, or aluminum or aluminum alloy containing one element or more selected from Mg, Ti, Zn, Mn, Fe, Cu, and Si. The negative electrode current collector preferably has a thickness in the range of 5 µm to 20 µm. The negative electrode current collector having such a thickness can keep the strength of electrode and the reduction of weight in balance.

The current collector can also include a part on the surface thereof in which no negative electrode active material-containing layer is formed. The part can work as a negative electrode tab.

The negative electrode can be produced by, for example, the following method. First, a slurry is prepared by suspending a negative electrode active material, a conductive agent, and a binder in an appropriate solvent. The slurry is applied to one surface or both surfaces of a negative electrode current collector. Next, the applied slurry is dried to obtain a laminate of the negative electrode active material-containing layer and the negative electrode current collector. After that, the laminate is pressed. In this way, a negative electrode is produced.

Alternatively, the negative electrode may be produced by, for example, the following method. First, a negative electrode active material, a conductive agent, and a binder are mixed to obtain a mixture. Subsequently, the mixture is formed in pellets. Subsequently, a negative electrode can be obtained by placing the pellets on a negative electrode current collector.

<Method of Measuring Na Amount in Negative Electrode Active Material-Containing Layer>

(Preparation of the Measurement Sample)

First, a measurement sample is prepared following the procedure below.

A lithium ion secondary battery to be analyzed is prepared. The battery to be analyzed has a capacity of 80% or more of the nominal capacity.

A lithium ion secondary battery to be analyzed is brought into a discharged state. For example, the lithium ion secondary battery can be brought into a discharged state by discharging until the battery voltage is reached 1.8 V at a constant current of 5 C or less.

The lithium ion secondary battery is moved into a glove box filled with argon and disassembled there. Then, the negative electrode is taken out from the disassembled battery. The taken-out negative electrode is washed with, for example, ethyl methyl carbonate (EMC). Li salt adhering to the surface of the negative electrode can be removed by this washing. Next, the washed negative electrode is dried. In this manner, a negative electrode sample as a measurement sample is obtained.

(Analysis of Elements Contained in the Negative Electrode Active Material)

The elements contained in the negative electrode active material can be determined by using the inductively coupled plasma (ICP) emission spectrochemical analysis described below.

(ICP Analysis Procedure)

A portion of the negative electrode sample is put into an appropriate solvent to apply an ultrasonic wave thereto. For example, by putting an electrode body into ethylmethyl carbonate poured into a glass beaker and vibrating the electrode body in an ultrasonic washer, the negative electrode active material-containing layer can be peeled off from the current collector. Next, the peeled negative electrode active material-containing layer is dried by drying under reduced pressure. By grinding the obtained negative electrode active material-containing layer in a mortar or the like, a powder containing the negative electrode active material, conductive agent, binder, components of coating and the like is obtained. By dissolving the powder by acid, a liquid sample containing the negative electrode active material can be created. At this point, hydrochloric acid, nitric acid, sulfuric acid, hydrogen fluoride or the like can be used as acid. By subjecting the liquid solution sample to ICP emission spectrochemical analysis, metallic elements (including the Na element) contained in the negative electrode active material-containing layer can be determined.

For the analysis of elements contained in the negative electrode active material, scanning electron microscope—energy dispersive X-ray spectroscopy (SEM-EDX) described below may be used in combination.

(SEM-EDX Analysis Procedure)

The negative electrode sample prepared as described above is cut out by an ion milling machine to obtain the sample cross section. The cross section of the cut-out sample is observed using a scanning electron microscope. A sample is sampled in an inert atmosphere such as argon and nitrogen while avoiding contact with the atmosphere.

Some particles are randomly selected based on 3000× SEM observation images. If the particle is small and it is difficult to determine the particle size from 3000× images, the magnification may be increased. At this point, particles are selected such that the particle size distribution is of the selected particles is as wide as possible.

Next, the element analysis of each of the selected particles is conducted by an energy dispersive X-ray spectroscopic analysis apparatus accompanying the scanning electron microscope. Accordingly, the type and amount of elements excluding Li contained in each of the selected particles can be identified.

Subsequently, another analysis method of the negative electrode active material contained in a secondary battery according to the embodiment and a positive electrode active material described below will be described. More specifically, the method of examining the crystal structure, the method of measuring the average particle size of secondary particles, the method of examining the average particle size of primary particles, and the method of measuring the specific surface area will be described.

When the active material is incoLporated into a battery, the active material can be extracted, for example, as described below. First, the battery is brought into a discharged state. For example, it is possible to bring the battery into a discharged state, by discharging the battery in an environment of 25° C. at a current of 0.1 C to a rated cutoff voltage. Next, the battery in the discharged state is disassembled and an electrode (e.g., a negative electrode) is taken out. The taken-out electrode is washed with, for example, methyl ethyl carbonate.

The washed electrode is used as a measurement sample, after being appropriately processed or treated according to each measurement method. For example, when subjecting to a powder X-ray diffraction measurement, the washed electrode is cut to be of an area about equal to the area of the holder of a powder X-ray diffractometer, and used as a measurement sample, as described later.

An active material is extracted from the electrode if necessary, and used as a measurement sample. For example, in a case where polyvinylidene difluoride (PVdF) was used as the binder, the extraction process is performed in such a manner that the binder component is washed off, for example, with N-methyl-2-pyrrolidone (NMP), and then a conductive agent is removed with a mesh having an appropriate aperture. These components, if slightly left, may be removed by a heat treatment in air (e.g., at 250° C. for 30 minutes).

<Method of Examining Crystal Structure of Active Material>

The crystal structure of the active material can be examined by powder X-ray Diffraction (XRD) analysis.

The powder X-ray diffraction measurement of an active material is made as described below. First, the target sample is ground until an average particle size reaches about 5 μm. The average particle size can be determined, for example by laser diffraction, as explained later. The ground sample is filled in a flat holder part having a depth of 0.2 mm, formed on a glass sample plate. At this time, care should be taken to fill the holder part sufficiently with the sample. In addition, care should be taken to avoid cracking and voids caused by insufficient filling of the sample. Then, another glass plate is used to smoothen the surface of the sample by sufficiently pressing with the glass plate. In this case, care should be taken to avoid too much or too little filling amount, so as to prevent any rises and dents in the basic plane of the glass holder. Next, the glass plate filled with the sample is set in a powder X-ray diffractometer. And then, an x-ray diffraction (XRD) pattern is obtained using Cu-Kα rays.

In the case where a sample has high degree of orientation, there is the possibility of deviation of peak position and variation in an intensity ratio, depending on the way of filling the sample. In the case of such a sample having high degree of orientation, the sample is inserted into the capillary, which is then mounted on a rotary sample table and measured while being rotated. Such a method can provide XRD patterns of the active material with the influence of orientation reduced. In the case that there is a difference between the intensity ratio measured using this method and the intensity ratio measured using the above-described flat holder, it can be considered that orientation has an influence, and thus the measurement result using the rotary sample table is adopted.

When the active material to be measured is included in the electrode material of the lithium ion secondary battery, first, the electrode is taken out from the lithium ion secondary battery following the procedure described above. The taken-out and washed electrode is cut to be of an area about equal to the area of the holder of a powder X-ray diffractometer, and used as the measurement sample.

The obtained measurement sample is affixed directly to the glass holder, and measured. In this case, the position of the peak originated from the electrode substrate such as a metal foil is measured in advance. The peaks of other components such as a conductive agent and a binder are also measured in advance. If the peak of the substrate and that of the active material overlap, it is desirable to make measurements by peeling the active material-containing layer off the substrate. This is intended to separate overlapped peaks when peak strength is quantitatively measured. For example, the active material-containing layer can be separated by irradiating the electrode substrate with an ultrasonic wave in a solvent. In order to reduce the influence of orientation, in a similar manner as described above for a powder sample, the active material-containing layer is inserted into a capillary, mounted on a rotary sample table, and measured while being rotated.

Conditions of the above described powder X-ray diffraction measurement is set to conditions where an X-ray diffraction (XRD) pattern that is applicable to Rietveld analysis can be obtained. Specifically, in order to collect data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized compound can be determined.

<Method of Measuring Average Particle Size of Secondary Particle>

An example of a method of measuring an average particle size of secondary particles is as follows. As a measuring device, a laser diffraction distribution analyzer (SALD-300, Shimadzu) is used. First, about 0.1 g of sample is put into a beaker, to which is added a surfactant and 1 to 2 mL of distilled water and stirred well, and the mixture is poured into a stirring bath to prepare a sample solution therein. By using this sample solution, a luminous intensity distribution is measured for 64 times at intervals of 2 seconds, and particle size distribution data are analyzed.

<Method of Measuring Average Particle Size of Primary Particle>

It is possible to examine the average primary particle size by an observation with a scanning electron microscope (SEM). An average primary particle size is determined by obtaining an average of 10 typical particles extracted from a typical viewing field.

<Method of Measuring Specific Surface Area>

As a method of measuring a specific surface area, used herein is method where molecules, in which an occupied area in adsorption is known, are adsorbed onto the surfaces of powder particles at the temperature of liquid nitrogen, and the specific surface area of the sample is determined from the amount of adsorbed molecules. The most frequently used method is a BET method based on the low temperature/low humidity physical adsorption of an inert gas. This BET method is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

(3) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material and also optionally a conductive agent and a binder.

As the positive electrode active material, for example, an oxide, a sulfuric, or a polymer can be used. The positive electrode may contain one kind of compound alone as the positive electrode active material or two kinds of compound or more in combination. Examples of the oxide and sulfuric include a compound capable of having Li or Li ions be inserted therein and extracted therefrom.

Examples of the oxide include, for example, manganese dioxide ($MnO_2$), iron oxide, copper oxide, nickel oxide, lithium manganese composite oxide (e.g. $Li_xMn_2O_4$ or $Li_xMnO_2$; $0<x\le1$), lithium nickel composite oxide (e.g. $Li_xNiO_2$; $0<x\le1$), lithium cobalt composite oxide (e.g. $Li_xCoO_2$; $0<x\le1$), lithium nickel cobalt composite oxide (e.g. $Li_xNi_{1-y}Co_yO_2$; $0<x\le1$, $0<y<1$), lithium manganese cobalt composite oxide (e.g. $Li_xMn_yCo_{1-y}O_2$; $0<x\le1$, $0<y<1$), lithium manganese nickel composite oxide having a spinel structure (e.g. $Li_xMn_{2-y}Ni_yO_4$; $0<x\le1$, $0<y<2$), lithium phosphorus oxide having an olivine structure (e.g. $Li_xFePO_4$; $0<x\le1$, $Li_xFe_{1-y}Mn_yPO_4$; $0<x\le1$, $0<y<1$, $Li_xCoPO_4$; $0<x\le1$), iron sulfate ($Fe_2(SO_4)_3$), vanadium oxide (for example, $V_2O_5$), and lithium nickel cobalt manganese composite oxide ($Li_xNi_{1-x-y}Co_xMn_yO_2$; $0<x\le1$, $0<y<1$, $0<z<1$, $y+z<1$).

Examples of the polymer, which may be used, include conductive polymer materials such as polyaniline or polypyrrole, or disulfide-based polymer materials. Sulfur (S) or carbon fluoride may also be used as the active material.

Among the above compounds, examples of preferable compounds as the positive electrode active material include lithium manganese composite oxide having a spinel structure (e.g. $Li_xMn_2O_4$; $0<x\le1$), lithium nickel composite oxide (e.g. $Li_xNiO_2$; $0<x\le1$), lithium cobalt composite oxide (e.g. $Li_xCoO_2$; $0<x\le1$), lithium nickel cobalt composite oxide (e.g. $Li_xNi_{1-y}Co_yO_2$; $0<x\le1$, $0<y<1$), lithium manganese nickel composite oxide having a spinel structure (e.g. $Li_xMn_{2-y}Ni_yO_4$; $0<x\le1$, $0<y<2$), lithium manganese cobalt composite oxide (e.g. $Li_xMn_yCo_{1-y}O_2$; $0<x\le1$, $0<y<1$), lithium iron phosphate (e.g. $Li_xFePO_4$; $0<x\le1$), and lithium nickel cobalt manganese composite oxide ($Li_xNi_{1-x-y}Co_xMn_yO_2$; $0<x\le1$, $0<y<1$, $0<z<1$, $y+z<1$). The positive electrode potential can be increased by using these compounds as the positive electrode active material.

Lithium cobalt composite oxide is preferably used because of excellent rate performance. When lithium nickel cobalt manganese composite oxide is used, a high energy density can be achieved and further, excellent life performance can be achieved, which is preferable. Furthermore, spinel lithium manganese composite oxide is preferable because of excellent life and rate performance. Olivine lithium manganese iron composite phosphate compounds are excellent in life performance, particularly life performance at high temperature, which is preferable.

The conductive agent is compounded if necessary to enhance current collecting performance and to suppress contact resistance with the active material and the current collector. Examples of the conductive agent include carbon materials such as acetylene black, Ketjen black, graphite and/or coke. These carbon materials may be used alone as the conductive agent or a plurality of carbon materials may be used in combination.

The binder has the function of binding the active material, conductive agent, and current collector. As the binder, at least one compound selected from a group consisting of, for example, polytetrafluoro ethylene (PTFE), polyvinylidene difluoride (PVdF), cellulose based members such as sodium carboxymethylcellulose (CMC), fluororubber, styrene-butadiene rubber, and acrylic resin or copolymers thereof, polyacrylic acid, and polyacrylonitrile.

The compounding ratio of the total amount of the positive electrode active material and lithium inserting materials, the conductive agent, and the binder is preferably in the range of 80% by mass to 95% by mass, 3% by mass to 18% by mass, and 2% by mass to 17% by mass respectively. By setting the amount of the conductive agent to 3% by mass or more, the above effect can be achieved. By setting the amount of the conductive agent to 18% by mass or less, decomposition of the nonaqueous electrolyte on the surface of the conductive agent in storage at high temperature can be reduced. By setting the amount of the binder to 2% by mass or more, sufficient electrode strength can be obtained. By setting the amount of the binder to 17% by mass or less, the compounded amount of the binder as an insulating material in the positive electrode can be reduced to reduce internal resistance.

The positive electrode current collector is preferably aluminum foil or aluminum alloy foil containing one element or more selected from Mg, Ti, Zn, Ni, Cr, Mn, Fe, Cu, and Si.

The thickness of aluminum foil or aluminum alloy foil is preferably in the range of 5 μm to 20 μm and more preferably 15 μm or less. The purity of aluminum foil is preferably 99% by mass or more. The content of transition metals such as iron, copper, nickel, and chromium contained in aluminum foil or aluminum alloy foil is preferably 1% by mass or less.

The positive electrode current collector can also include a part on the surface thereof in which no positive electrode active material-containing layer is formed. The part can work as a positive electrode tab.

The positive electrode can be produced by, for example, the following method. First, a slurry is prepared by suspending a positive electrode active material, a conductive agent, and a binder in an appropriate solvent. In a case in which a solid electrolyte is contained in the positive electrode layer, the solid electrolyte particles are dispersed in the slurry. Subsequently, the slurry is coated on one surface or both surfaces of a positive electrode current collector. Subsequently, the applied slurry is dried to obtain a laminate of the positive electrode active material-containing layer and the positive electrode current collector. After that, the laminate is pressed. In this way, a positive electrode is produced.

Alternatively, the positive electrode may be produced by, for example, the following method. First, a positive electrode active material, solid electrolyte particles optionally contained, a conductive agent, and a binder are mixed to obtain a mixture. Subsequently, the mixture is formed in pellets. Subsequently, a positive electrode can be obtained by placing the pellets on a positive electrode current collector.

(4) Separator

The separator is formed from, for example, a porous film including polyethylene (PE), polypropylene (PP), cellulose, and polyvinylidene difluoride (PVdF) or nonwoven fabric made of synthetic resin. From the viewpoint of safety, it is preferable to use a porous film made of polyethylene or polypropylene. This is because these porous films melt at a fixed temperature and can cut off a current.

(5) Container Member

As the container member, for example, a container made of a laminated film or a metal case can be used.

The thickness of the laminated film is, for example, 0.5 mm or less and preferably 0.2 mm or less.

As the laminated film, a multilayer film including a plurality of resin layers and a metal film interposed between these resin layers is used. The resin layer includes, for example, polymeric materials such as polypropylene (PP), polyethylene (PE), nylon, and polyethylene terephthalate (PET). The metal layer is preferably made of aluminum foil or aluminum alloy foil to reduce the weight thereof. The laminated film can be formed into the shape of a container member by performing heat sealing.

The thickness of a wall of the metal case is, for example, 1 mm or less, preferably 0.5 mm or less, and more preferably 0.2 mm or less.

The metal case is made of aluminum or an aluminum alloy, for example. The aluminum alloy preferably contains an element such as magnesium, zinc, or silicon. When the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can appropriately be selected in accordance with battery dimensions or battery uses.

(6) Negative Electrode Terminal

The negative electrode terminal can be formed from, for example, a material having electric stability and conductivity, in which the potential with respect to lithium is within a range of 0.4 V to 3 V (vs Li/Li$^+$). More specifically, as the material of the negative electrode terminal, copper, nickel, stainless, or aluminum or an aluminum alloy containing at least one element selected from a group consisting of Mg, Ti, Zn, Mn, Fe, Cu, and Si can be cited. It is preferable to use aluminum or an aluminum alloy as the material of the negative electrode terminal. The negative electrode terminal is preferably made of the same material as that of the negative electrode current collector, so as to reduce contact resistance with the negative electrode current collector.

The positive electrode terminal is made of a material that is electrically stable in a potential range of 3 V to 4.5 V with respect to oxidation-reduction potential of lithium (vs. Li/Li$^+$) and has a conductive property. Examples of the material for the positive electrode terminal include aluminum, or an aluminum alloy containing at least one element selected from Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

Next, the secondary battery according to the embodiment will be described in detail with reference to the drawings.

Figure 2:
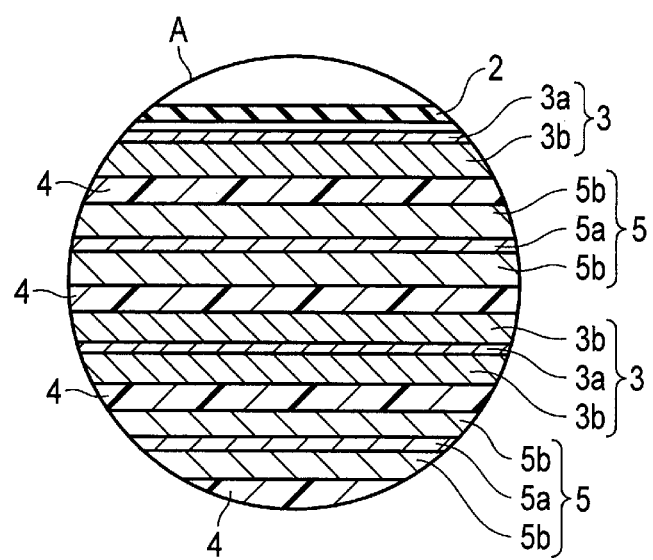
FIG. 2 is an enlarged cross-sectional view showing part A of the lithium ion secondary battery shown in FIG. 1.

FIG. 1 is a sectional view schematically showing an example of a secondary battery according to an embodiment. FIG. 2 is an enlarged sectional view of a portion A of the secondary battery shown in FIG. 1.

The secondary battery 100 shown in FIG. 1 and FIG. 2 includes a bag-shaped container member 2 shown in FIG. 1, an electrode group 1 shown in FIG. 1 and FIG. 2, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As shown in FIG. 1, the electrode group 1 is a flat wound electrode group. The flat wound electrode group 1 includes negative electrodes 3, separators 4, and positive electrodes 5 as shown in FIG. 2. The separator 4 is disposed between the negative electrode 3 and the positive electrode 5.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 2. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 1, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the openings are closed by thermal fusion bonding of the thermoplastic resin layer.

The secondary battery according to the embodiment is not limited to the secondary battery having the structure shown in FIGS. 1 and 2, and may be, for example, a battery having a structure shown in FIGS. 3 and 4.

FIG. 3 is a partial cut-away sectional perspective view schematically showing another example of the secondary battery according to the embodiment. FIG. 4 is an enlarged sectional view of a portion B of the secondary battery shown in FIG. 3.

The secondary battery 100 shown in FIGS. 3 and 4 includes an electrode group 1 shown in FIGS. 3 and 4, a container member 2 shown in FIG. 3, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 4, the electrode group 1 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 4, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

FIG. 5 is a perspective view schematically showing an example of the battery module according to the embodiment. The battery module 200 shown in FIG. 5 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 5 is a battery module of five in-series connection.

As shown in FIG. 5, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The lithium ion secondary battery according to the first embodiment includes a negative electrode including a negative electrode active material-containing layer, a positive electrode, and an electrolyte containing Li ions and Na ions. The negative electrode active material-containing layer contains a Na-containing titanium composite oxide. A ratio ($W_E/W_A$) of an Na amount $W_E$ (g/g) in the electrolyte to an Na amount $W_A$ (g/g) in the negative electrode active material-containing layer satisfies Formula (1) below:

$$1\times10^{-1} \leq W_E/W_A \leq 1\times10^5 \quad (1).$$

Therefore, in the lithium ion secondary battery according to the embodiment, the Na element is less likely to be eluted from the crystal structure of the Na-containing titanium composite oxide contained in the negative electrode, which makes life performance excellent.

Second Embodiment

According to a second embodiment, a battery pack is provided. The battery pack includes the secondary battery according to the first embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 6:
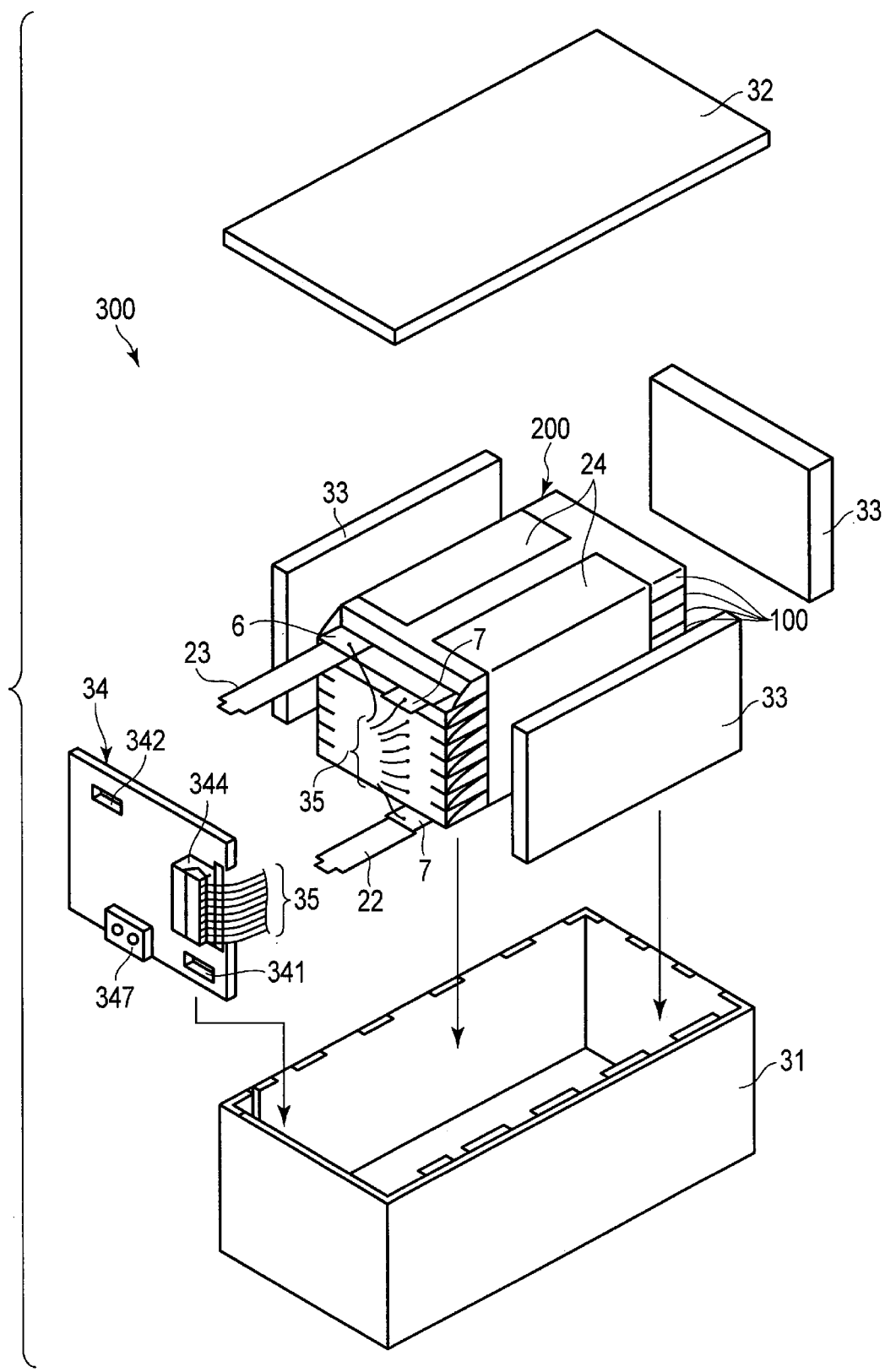
FIG. 6 is an exploded perspective view schematically showing an example of a battery pack according to the second embodiment.
Figure 7:
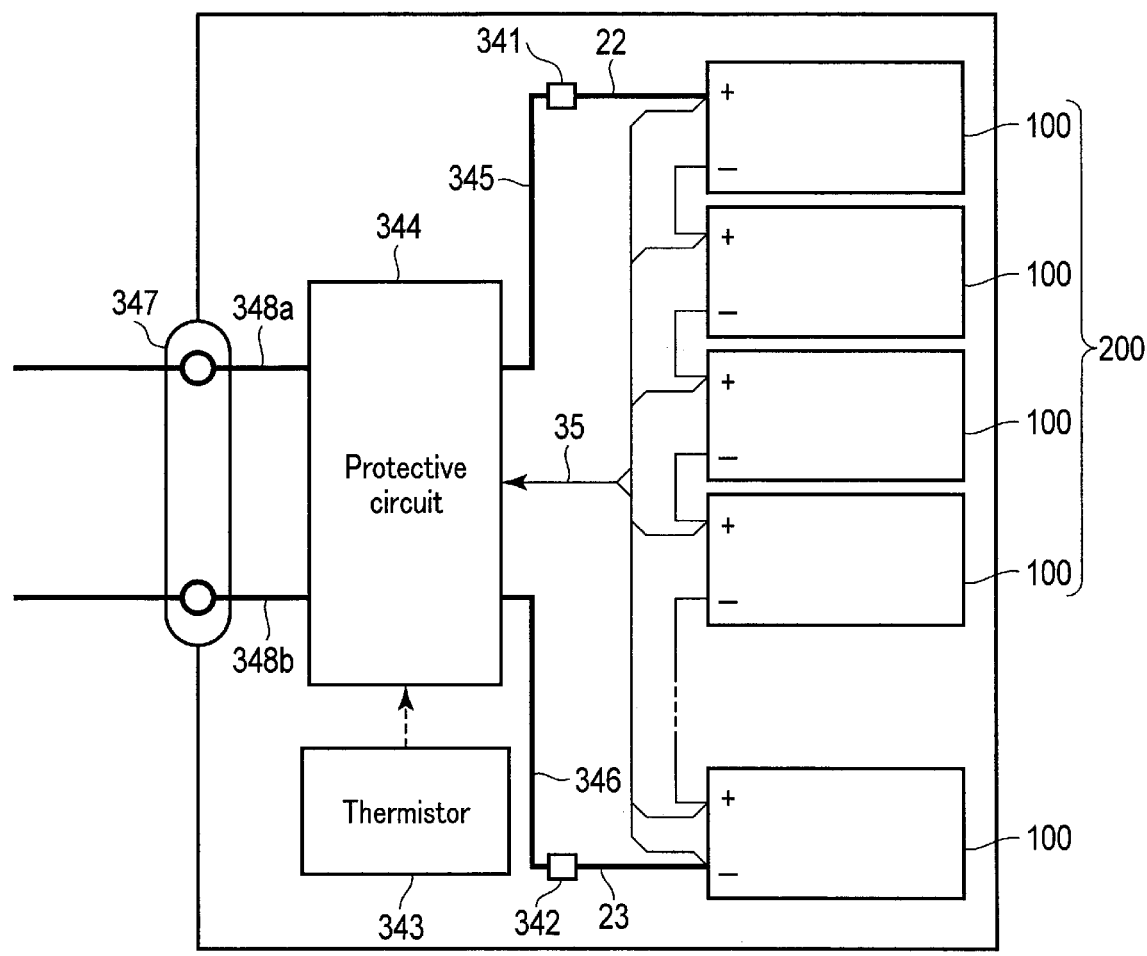
FIG. 7 is a block diagram showing an example of an electric circuit of the battery pack shown in FIG. 6.

FIG. 6 is an exploded perspective view schematically showing an example of the battery pack according to the embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

A housing container 31 shown in FIG. 6 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode-side lead 22, a negative electrode-side lead 23, and an adhesive tape 24.

The battery cell 100 has, for example, a structure shown in FIGS. 1 and 2. At least one of the plural battery cells 100 is a secondary battery according to the first embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 7. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the second embodiment includes a lithium ion secondary battery according to the first embodiment. Therefore, the battery pack can achieve excellent life performance.

Third Embodiment

According to a third embodiment, a vehicle is provided. The vehicle is equipped with the battery pack according to the second embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

Figure 8:
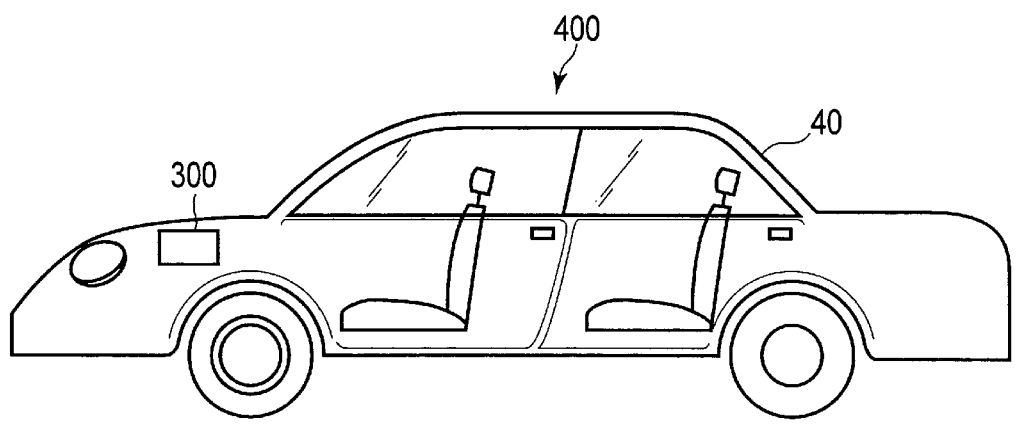
FIG. 8 is a cross-sectional view schematically showing an example of a vehicle according to the third embodiment.

FIG. 8 is a sectional view schematically showing an example of a vehicle according to the embodiment.

The vehicle 400 shown in FIG. 8 includes a vehicle body 40 and a battery pack 300 according to the second embodiment. The vehicle 400 shown in FIG. 8 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 8, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 9:
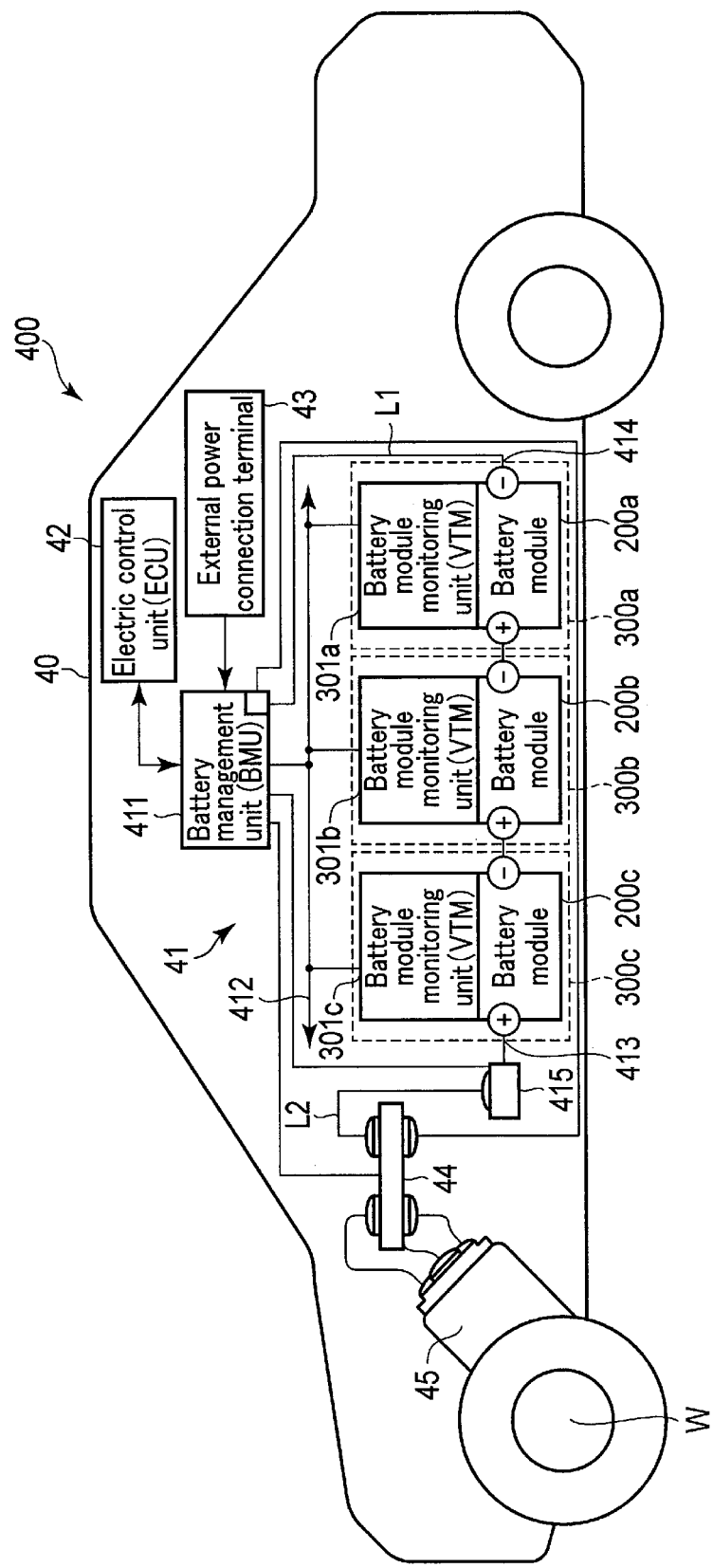
FIG. 9 is a diagram schematically showing another example of the vehicle according to the third embodiment.

Next, with reference to FIG. 9, an aspect of operation of the vehicle according to the embodiment is explained.

FIG. 9 is a view schematically showing an example of the vehicle according to the embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 9) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the third embodiment includes the battery pack according to the second embodiment. Therefore, according to this embodiment, it is possible to provide the vehicle equipped with the battery pack capable of achieving excellent life performance.

EXAMPLES

Examples are explained below, but the embodiments are not limited to Examples described below.

Example 1

In Example 1, a nonaqueous electrolyte battery according to Example 1 was produced following the procedure below.
<Production of Negative Electrode Active Material>

Following the procedure below, $Li_{2.0}Na_{1.5}Ti_{5.5}Nb_{0.5}O_{14}$ was synthesized as orthorhombic Na-containing niobium titanium composite oxide.

First, titanium oxide $TiO_2$, lithium carbonate $Li_2CO_3$, sodium carbonate $Na_2CO_3$, and niobium (V) hydroxide $Nb(OH)_5$ were prepared as materials. These materials were mixed such that the molar ratio of Li:Na:Ti:Nb of the mixture becomes 2.0:1.5:5.5:0.5. Before the mixing, the materials were sufficiently ground.

The mixed materials were subjected to heat treatment in the atmosphere at 1000° C. for 10 hours. In this manner, a powder of the product was obtained. The powder of the obtained product was subjected to wet ball milling for five hours in pure water and filtering, then being thermally retreated. The condition for heat retreatment was 600° C. and three hours. In this manner, a powder of the negative electrode active material was obtained.

The obtained negative electrode active material was analyzed by SEM-EDX, ICP, and XRD described in the first embodiment. As a result, it was found out that the obtained negative electrode active material was a powder of orthorhombic Na-containing niobium titanium composite oxide having the composition represented by the expression $Li_{2.0}Na_{1.5}Ti_{5.5}Nb_{0.5}O_{14}$. The average particle size of the negative electrode active material powder was 5 μm.

<Production of Negative Electrode>

The negative electrode active material produced above, acetylene black, and polyvinylidene fluoride (PVdF) were dispersed in N-methyl-pyrrolidone (NMP) in a compounding ratio of 90% by mass:5% by mass:5% by mass and mixed to obtain a mixture. The mixture was further stirred using a planetary centrifugal mixer to prepare a slurry. The slurry was applied to both sides of a current collector made of aluminum foil whose thickness is 15 μm and a coated film was dried. Next, the dried coated film was pressed to produce a negative electrode containing the current collector and the negative electrode active material-containing layer formed on the current collector and whose electrode density (excluding the current collector) is 2.3 g/cm³.

The percentage of void of the negative electrode active material-containing layer formed in the negative electrode was 70% and the specific surface area thereof was 5 m²/g.

When the slurry was applied, a slurry non-applied part was left in a part of the current collector. This part was regarded as a negative electrode tab. A negative electrode terminal was ultrasonically joined to the negative electrode tab.

Also, the result of measurement of the Na amount contained in the negative electrode active material-containing layer according to the method of measuring the Na amount described in the first embodiment was $5.0 \times 10^{-5}$ g/g.

<Production of Positive Electrode>

Following the procedure below, $LiMn_2O_4$ was synthesized as a spinel lithium manganate.

First, lithium carbonate $Li_2CO_3$ and manganese carbonate $MnCO_3$ were prepared as materials. These materials were mixed such that the molar ratio of Li:Mn of the mixture becomes 1.0:2.0. Before the mixing, the materials were sufficiently ground.

The mixed materials were subjected to heat treatment in the atmosphere at 700° C. for 10 hours. In this manner, a powder of the product was obtained.

The obtained product was analyzed by ICP, SEM-EDX, and XRD described above. As a result, it was found out that the obtained positive electrode active material was a powder of spinel lithium manganate having the composition represented by the expression $LiMn_2O_4$.

The positive electrode active material produced above, acetylene black, and polyvinylidene fluoride (PVdF) were dispersed in N-methyl-pyrrolidone (NMP) in a compounding ratio of 90% by mass:5% by mass:5% by mass and mixed to obtain a mixture. The mixture was further stirred using a planetary centrifugal mixer to prepare a slurry. The slurry was applied to both sides of a current collector made of aluminum foil whose thickness is 15 μm and a coated film was dried. Next, the dried coated film was pressed to produce a positive electrode containing the current collector and the positive electrode active material-containing layer formed on the current collector and whose electrode density (excluding the current collector) is 2.9 g/cm³.

When the slurry was applied, a slurry non-applied part was left in a part of the current collector. This part was regarded as a positive electrode tab. A positive electrode terminal was ultrasonically joined to the positive electrode tab.

<Production of Electrode Group>

Two separators made of a porous film made of polyethylene whose thickness is 25 μm were prepared. Next, the positive electrode produced as described above, one separator, the negative electrode produced as described above, and the other separator were stacked in this order to obtain a laminated body. The laminated body was wound spirally to obtain a wound body. Next, a winding core was pulled out of the wound body and subjected to a hot press at 90° C. In this manner, a flat electrode group whose width is 30 mm and whose thickness is 3.0 mm was produced.

<Preparation of Liquid Nonaqueous Electrolyte>

Propylene carbonate (PC) and ethylmethyl carbonate (EMC) were prepared as nonaqueous solvent. These solvents were mixed such that the volume ratio of PC:EMC becomes 1:2 to prepare a mixed solvent.

Lithium hexafluorophosphate ($LiPF_6$) and sodium hexafluorophosphate ($NaPF_6$) were each dissolved in the mixed solvent in the concentration of 1.2 M. In this manner, a liquid nonaqueous electrolyte was prepared.

The result of measurement of the Na amount $W_E$ contained in the liquid nonaqueous electrolyte according to the ICP analysis described in the first embodiment was $2.0 \times 10^{-2}$ g/g.

<Housing of Electrode Group in Container Member>

The obtained electrode group was wrapped in a laminated film. As the laminated film, a laminated film constituted by forming a propylene layer on both sides of aluminum foil whose thickness is 40 μm and the overall thickness thereof is 0.1 mm was used. At this point, a part of the negative electrode terminal was inserted between two propylene layers opposite to each other on one end of the laminated film. Another part of the negative electrode terminal was extended outward of the laminated film. Similarly, a part of the positive electrode was inserted between two propylene layers opposite to each other on one end of the laminated film. Another part of the positive electrode terminal was extended outward of the laminated film. In this manner, the electrode group was housed in the container member made of a laminated film.

Next, the electrode group was subjected to vacuum drying at 80° C. for 24 hours in the container member.

<Production of Battery Unit>

A battery unit described below was produced in a dry argon environment.

First, the liquid nonaqueous electrolyte prepared before was injected into the container member.

Next, the end of the laminated film where a part of the negative electrode terminal had been inserted was heat-sealed. Similarly, the end of the laminated film where a part of the positive electrode terminal had been inserted was heat-sealed. In this manner, the electrode group and the liquid nonaqueous electrolyte were completely sealed inside the container member to produce a battery unit.

<Aging Treatment and Production of Nonaqueous Electrolyte>

The voltage of the battery unit was adjusted to 2.5V and subjected to aging treatment. The aging treatment was performed for 10 hours in an environment of 60° C. Next, the container member was cut open in a dry argon environment to release a gas inside the container member.

Then, the container member was heat-sealed again in a dry argon environment to completely seal the electrode group and the liquid nonaqueous electrolyte inside the container member. In this manner, a nonaqueous electrolyte battery according to Example 1 was produced. The nonaqueous electrolyte battery had the width of 35 mm, the thickness of 3.2 mm, and the height of 65 mm.

<Charge-and-Discharge Cycle Test of Nonaqueous Electrolyte Battery>

Following the procedure below, the obtained nonaqueous electrolyte battery was subjected to a high-temperature charge-and-discharge cycle test.

The temperature environment of the test was set to 60° C. First, the nonaqueous electrolyte battery was charged until the voltage reached 3.0 V at a constant current value of 0.2 C and next, the nonaqueous electrolyte battery was charged at a constant voltage of 3.0 V. The charging was stopped when the current value reached 1/20 C. The discharging was carried out at a constant current of 0.2 C. The discharging was stopped when the voltage of the nonaqueous electrolyte battery reached 1.8 V. A pause of one minute was inserted between the charging and discharging in the same temperature environment. The charging, a pause, the discharging and a pause were set as one cycle. The cycle number to be performed in this test was set to 500 cycles. The capacity retention (%) after 500 cycles at high temperature was evaluated as a percentage by dividing the discharge capacity in the 500th cycle of the nonaqueous electrolyte battery by the discharge capacity in the first cycle. The capacity retention is an index of cycle performance of the electrode.

The above results are summarized in Table 1 below. Table 1 also shows results of Examples 2 to 9 and Comparative Examples 1 to 3 described below.

In the column of "Capacity retention" in Table 1, the value of the capacity retention evaluated by the above charge-and-discharge cycle test is described.

Examples 2 to 4

Following Table 1 below, nonaqueous electrolyte batteries were produced in the same manner as described in Example 1 except that the concentration of sodium salt ($NaPF_6$) dissolved in the nonaqueous electrolyte was changed and then evaluated.

Example 5

A nonaqueous electrolyte battery was produced in the same manner as described in Example 1 except that the negative electrode active material was produced by the method below and then evaluated.

Following the procedure below, $Li_{2.0}Na_{1.8}Ti_{5.8}Nb_{0.2}O_{14}$ was synthesized as orthorhombic Na-containing niobium titanium composite oxide.

First, titanium oxide $TiO_2$, lithium carbonate $Li_2CO_3$, sodium carbonate $Na_2CO_3$, and niobium (V) hydroxide $Nb(OH)_5$ were prepared as materials. These materials were mixed such that the molar ratio of Li:Na:Ti:Nb of the mixture becomes 2.0:1.8:5.8:0.2. Before the mixing, the materials were sufficiently ground.

The mixed materials were subjected to heat treatment in the atmosphere at 1000° C. for 10 hours. In this manner, a powder of the product was obtained. The powder of the obtained product was subjected to wet ball milling for five hours in pure water and filtering, then being thermally retreated. The condition for heat retreatment was 600° C. and three hours. In this manner, a powder of the negative electrode active material was obtained.

Examples 6 and 7

Following Table 1 below, nonaqueous electrolyte batteries were produced in the same manner as described in Example 1 except that the kind of positive electrode active material was changed and then evaluated.

Example 8

A nonaqueous electrolyte battery was produced in the same manner as described in Example 1 except that the negative electrode active material was produced by the method below and then evaluated.

Following the procedure below, $Li_{2.0}Na_{1.3}Sr_{0.1}Ti_{5.5}Nb_{0.5}O_{14}$ was synthesized as orthorhombic Na-containing niobium titanium composite oxide.

First, titanium oxide $TiO_2$, lithium carbonate $Li_2CO_3$, sodium carbonate $Na_2CO_3$, strontium carbonate $SrCO_3$, and niobium (V) hydroxide $Nb(OH)_5$ were prepared as materials.

These materials were mixed such that the molar ratio of Li:Na:Sr:Ti:Nb of the mixture becomes 2.0:1.3:0.1:5.5:0.5. Before the mixing, the materials were sufficiently ground.

The mixed materials were subjected to heat treatment in the atmosphere at 1000° C. for 10 hours. In this manner, a powder of the product was obtained. The powder of the obtained product was subjected to wet ball milling for five hours in pure water and filtering, then being thermally retreated. The condition for heat retreatment was 600° C. and three hours. In this manner, a powder of the negative electrode active material was obtained.

Example 9

A nonaqueous electrolyte battery was produced in the same manner as described in Example 1 except that the nonaqueous electrolyte described below was used and then evaluated.

Propylene carbonate (PC) and diethyl carbonate (DEC) were prepared. These solvents were mixed such that the volume ratio of PC:DEC becomes 1:2 to prepare a mixed solvent.

Lithium hexafluorophosphate ($LiPF_6$) and sodium hexafluorophosphate ($NaPF_6$) were each dissolved in the mixed solvent in the concentration of 1.2 M. In this manner, a liquid nonaqueous electrolyte was prepared.

Example 10

A nonaqueous electrolyte battery was produced in the same manner as described in Example 1 except that a mixture obtained by mixing a powder of orthorhombic Na-containing niobium titanium composite oxide having the composition represented by $Li_{2.4}Na_{1.5}Ti_{5.5}Nb_{0.5}O_{14}$ synthesized in Example 1 and a powder of $LiTi_5O_{12}$ in a weight ratio of 1:1 was used as the negative electrode active material and then evaluated.

Example 11

A nonaqueous electrolyte battery was produced in the same manner as described in Example 1 except that a mixture obtained by mixing a powder of orthorhombic Na-containing niobium titanium composite oxide having the composition represented by $Li_{2.0}Na_{1.5}Ti_{5.5}Nb_{0.5}O_{14}$ synthesized in Example 1 and a powder of $TiO_2(B)$ in a weight ratio of 1:1 was used as the negative electrode active material and then evaluated.

Comparative Example 1

A nonaqueous electrolyte battery was produced in the same manner as described in Example 1 except that sodium salt was not added to the nonaqueous electrolyte and then evaluated.

Comparative Example 2

A nonaqueous electrolyte battery was produced in the same manner as described in Example 1 except that the concentration of sodium salt ($NaPF_6$) dissolved in the nonaqueous electrolyte was changed to 0.001 mol/L and then evaluated.

Comparative Example 3

A nonaqueous electrolyte battery was produced in the same manner as described in Example 1 except that the concentration of sodium salt ($NaPF_6$) dissolved in the nonaqueous electrolyte was changed to 4 mol/L and then evaluated.

Na amount $W_A$ (g/g) in the negative electrode active material-containing layer satisfies Formula (1) below:

$$1 \times 10^{-1} \leq W_E/W_A \leq 1 \times 10^5 \qquad (1).$$

Therefore, in the secondary battery according to the embodiment, the Na element is less likely to be eluted from

TABLE 1

| | Positive electrode active material | Negative electrode active material | Electrolyte solvent (volume ratio) | Electrolyte Na ion concentration (mol/L) | Electrolyte Li ion concentration (mol/L) |
|---|---|---|---|---|---|
| Example 1 | $LiMn_2O_4$ | $Li_2Na_{1.5}Ti_{5.5}Nb_{0.5}O_{14}$ | PC:EMC = 1:2 | 1.2 | 1.2 |
| Example 2 | $LiMn_2O_4$ | $Li_2Na_{1.5}Ti_{5.5}Nb_{0.5}O_{14}$ | PC:EMC = 1:2 | 0.5 | 1.2 |
| Example 3 | $LiMn_2O_4$ | $Li_2Na_{1.5}Ti_{5.5}Nb_{0.5}O_{14}$ | PC:EMC = 1:2 | 0.1 | 1.2 |
| Example 4 | $LiMn_2O_4$ | $Li_2Na_{1.5}Ti_{5.5}Nb_{0.5}O_{14}$ | PC:EMC = 1:2 | 0.05 | 1.2 |
| Example 5 | $LiMn_2O_4$ | $Li_2Na_{1.8}Ti_{5.8}Nb_{0.2}O_{14}$ | PC:EMC = 1:2 | 1.2 | 1.2 |
| Example 6 | $LiFePO_4$ | $Li_2Na_{1.5}Ti_{5.5}Nb_{0.5}O_{14}$ | PC:EMC = 1:2 | 1.2 | 1.2 |
| Example 7 | $LiCoO_2$ | $Li_2Na_{1.5}Ti_{5.5}Nb_{0.5}O_{14}$ | PC:EMC = 1:2 | 1.2 | 1.2 |
| Example 8 | $LiMn_2O_4$ | $Li_2Na_{1.3}Sr_{0.1}Ti_{5.5}Nb_{0.5}O_{14}$ | PC:EMC = 1:2 | 1.2 | 1.2 |
| Example 9 | $LiMn_2O_4$ | $Li_2Na_{1.5}Ti_{5.5}Nb_{0.5}O_{14}$ | PC:DMC = 1:2 | 1.2 | 1.2 |
| Example 10 | $LiMn_2O_4$ | $Li_2Na_{1.5}Ti_{5.5}Nb_{0.5}O_{14}$ + $Li_4Ti_5O_{12}$ (1:1(wt. %)) | PC:EMC = 1:2 | 1.2 | 1.2 |
| Example 11 | $LiMn_2O_4$ | $Li_2Na_{1.5}Ti_{5.5}Nb_{0.5}O_{14}$ + $TiO_2$ (B)(1:1(wt. %)) | PC:EMC = 1:2 | 1.2 | 1.2 |
| Comparative Example 1 | $LiMn_2O_4$ | $Li_2Na_{1.5}Ti_{5.5}Nb_{0.5}O_{14}$ | PC:EMC = 1:2 | 0 | 1.2 |
| Comparative Example 2 | $LiMn_2O_4$ | $Li_2Na_{1.5}Ti_{5.5}Nb_{0.5}O_{14}$ | PC:EMC = 1:2 | 0.001 | 1.2 |
| Comparative Example 3 | $LiMn_2O_4$ | $Li_2Na_{1.5}Ti_{5.5}Nb_{0.5}O_{14}$ | PC:EMC = 1:2 | 4 | 1.2 |

| | Negative electrode active material-containing layer Na amount $W_A$(g/g) | Electrolyte Na amount $W_E$(g/g) | Ratio $W_E/W_A$ | Capacity retention (%) |
|---|---|---|---|---|
| Example 1 | $5.0 \times 10^{-5}$ | $2.0 \times 10^{-2}$ | $4.0 \times 10^2$ | 95 |
| Example 2 | $5.0 \times 10^{-5}$ | $2.0 \times 10^{-3}$ | $4.0 \times 10^1$ | 92 |
| Example 3 | $5.0 \times 10^{-5}$ | $2.0 \times 10^{-4}$ | 4.0 | 85 |
| Example 4 | $5.0 \times 10^{-5}$ | $2.0 \times 10^{-5}$ | $4.0 \times 10^{-1}$ | 81 |
| Example 5 | $6.0 \times 10^{-3}$ | $2.0 \times 10^{-2}$ | 3.3 | 93 |
| Example 6 | $5.0 \times 10^{-5}$ | $2.0 \times 10^{-2}$ | $4.0 \times 10^2$ | 96 |
| Example 7 | $5.0 \times 10^{-5}$ | $2.0 \times 10^{-2}$ | $4.0 \times 10^2$ | 92 |
| Example 8 | $4.3 \times 10^{-5}$ | $2.0 \times 10^{-2}$ | $4.7 \times 10^2$ | 91 |
| Example 9 | $5.0 \times 10^{-5}$ | $2.0 \times 10^{-2}$ | $4.0 \times 10^2$ | 96 |
| Example 10 | $2.5 \times 10^{-5}$ | $2.0 \times 10^{-2}$ | $8.0 \times 10^2$ | 94 |
| Example 11 | $2.5 \times 10^{-5}$ | $2.0 \times 10^{-2}$ | $8.0 \times 10^2$ | 83 |
| Comparative Example 1 | $5.0 \times 10^{-5}$ | 0 | 0 | 75 |
| Comparative Example 2 | $5.0 \times 10^{-5}$ | $2.0 \times 10^{-6}$ | $4.0 \times 10^{-2}$ | 77 |
| Comparative Example 3 | $5.0 \times 10^{-5}$ | $5.0 \times 10^1$ | $1.0 \times 10^6$ | 74 |

As shown in Examples 1 to 4, life performance tends to improve with an increasing ratio $W_E/W_A$.

As shown in Example 5, excellent life performance is also exhibited even if the Na amount in the negative electrode active material-containing layer is changed.

As shown in Example 8, excellent life performance is also exhibited even if a negative electrode active material containing Sr is used.

As shown in Example 9, excellent life performance is also exhibited even if the kind of the organic solvent of the electrolyte is changed.

A lithium ion secondary battery according to at least one of the embodiments and Examples includes a negative electrode including a negative electrode containing a negative electrode active material-containing layer, a positive electrode, and an electrolyte containing Li ions and Na ions. The negative electrode active material-containing layer contains a Na-containing titanium composite oxide. A ratio ($W_E/W_A$) of an Na amount $W_E$ (g/g) in the electrolyte to an Na amount $W_A$ (g/g) in the negative electrode active material-containing layer satisfies Formula (1) below:

the crystal structure of the Na-containing titanium composite oxide contained in the negative electrode, which makes life performance excellent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A lithium ion secondary battery comprising:
   a negative electrode comprising a negative electrode active material-containing layer;

a positive electrode; and an electrolyte comprising a lithium salt, a sodium salt, Li ions and Na ions, wherein the electrolyte satisfies a first condition or a second condition, the first condition is a condition that a concentration of the lithium salt in the electrolyte is within a range of 1.2 mol/L to 2.5 mol/L, and a concentration of the sodium salt in the electrolyte is within a range of 1.2 mol/L to 2.0 mol/L, the second condition is a condition that a concentration of the lithium salt in the electrolyte is within a range of 0.5 mol/L to 1.2 mol/L, and a concentration of the sodium salt in the electrolyte is within a range of 0.6 mol/L to 1.2 mol/L, and the negative electrode active material-containing layer comprises a Na-containing titanium composite oxide, and a ratio ($W_E/W_A$) of an Na amount $W_E$ (g/g) in the electrolyte to an Na amount $W_A$ (g/g) in the negative electrode active material-containing layer satisfies Formula (1) below:

$$1\times10^{-1} \leq W_E/W_A < 1\times10^5 \quad (1).$$

2. The lithium ion secondary battery according to claim 1, wherein the Na-containing titanium composite oxide comprises a Na-containing niobium titanium composite oxide having an orthorhombic crystal structure.

3. The lithium ion secondary battery according to claim 2, wherein the Na-containing niobium titanium composite oxide having the orthorhombic crystal structure comprises a composite oxide represented by a general formula $Li_{2+v}Na_{2-w}M1_xTi_{6-y-z}Nb_yM2_zO_{14+\delta}$, the M1 is at least one element selected from a group consisting of Cs, K, Mg, Sr, Ba, and Ca, the M2 is at least one element selected from a group consisting of Zr, Sn, Ta, Mo, W, Fe, Co, Mn, and Al, v is within a range of $0 \leq v \leq 4$, w is within a range of $0 \leq w < 2$, x is within a range of $0 \leq x < 2$, y is within a range of $0 < y < 2$, z is within a range of $0 \leq z < 3$, and $\delta$ is within a range of $-0.5 \leq \delta \leq 0.5$.

4. The lithium ion secondary battery according to claim 1, wherein the ratio ($W_E/W_A$) is within a range of 1 to $1\times10^3$.

5. The lithium ion secondary battery according to claim 1, wherein a total concentration of a concentration (mol/L) of the Li ions in the electrolyte and a concentration (mol/L) of the Na ions in the electrolyte is 4.0 mol/L or less.

6. The lithium ion secondary battery according to claim 1, wherein the electrolyte comprises at least one compound selected from a group consisting of propylene carbonate, ethylene carbonate, diethyl carbonate, dimethyl carbonate, and ethylmethyl carbonate.

7. A battery pack comprising the lithium ion secondary battery according to claim 1.

8. The battery pack according to claim 7, further comprising an external power distribution terminal and a protective circuit.

9. The battery pack according to claim 7, further comprising plural of the lithium ion secondary battery, wherein the lithium ion secondary batteries are electrically connected in series, in parallel, or in a combination of in series and in parallel.

10. A vehicle comprising the battery pack according to claim 7.

11. The vehicle according to claim 10, which comprises a mechanism configured to convert kinetic energy of the vehicle into regenerative energy.

12. The lithium ion secondary battery according to claim 1, wherein the ratio ($W_E/W_A$) is within a range of $4\times10^{-1}$ to $1\times10^3$.

13. The lithium ion secondary battery according to claim 1, wherein the ratio ($W_E/W_A$) is within a range of $4\times10^{-1}$ to $8\times10^2$.

* * * * *